US008515345B2

(12) United States Patent
Takayama

(10) Patent No.: US 8,515,345 B2
(45) Date of Patent: Aug. 20, 2013

(54) COMMUNICATION APPARATUS, COMMUNICATION METHOD, AND PROGRAM

(75) Inventor: Yoshihisa Takayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 610 days.

(21) Appl. No.: 11/814,974

(22) PCT Filed: Jan. 27, 2006

(86) PCT No.: PCT/JP2006/301309
§ 371 (c)(1),
(2), (4) Date: Aug. 1, 2007

(87) PCT Pub. No.: WO2006/080435
PCT Pub. Date: Aug. 3, 2006

(65) Prior Publication Data
US 2008/0299907 A1    Dec. 4, 2008

(30) Foreign Application Priority Data
Jan. 31, 2005  (JP) ................................. P2005-023434

(51) Int. Cl.
*H04B 5/00*  (2006.01)
*H04B 7/00*  (2006.01)

(52) U.S. Cl.
USPC ........................................ 455/41.1; 455/41.2

(58) Field of Classification Search
USPC ................... 455/41.2, 41.1, 41.3; 370/395.4
See application file for complete search history.

(56) References Cited

U.S. PATENT DOCUMENTS

| 5,473,691 | A  | * | 12/1995 | Menezes et al. | 713/161 |
| 5,621,894 | A  | * | 4/1997 | Menezes et al. | 709/227 |
| 5,636,037 | A  | * | 6/1997 | Saitoh | 358/442 |
| 6,487,241 | B1 |   | 11/2002 | Cole | |
| 6,972,858 | B1 | * | 12/2005 | Nishida et al. | 358/1.15 |
| 7,151,779 | B2 | * | 12/2006 | Park | 370/437 |
| 2005/0077356 | A1 |   | 4/2005 | Takayama et al. | |
| 2005/0180360 | A1 | * | 8/2005 | Hansen et al. | 455/101 |
| 2006/0082220 | A1 | * | 4/2006 | Karam et al. | 307/4 |

FOREIGN PATENT DOCUMENTS

| JP | 07-15525 | * | 1/1995 |
| JP | 2003-515981 | | 5/2003 |
| JP | 2004-215225 | | 7/2004 |

(Continued)

OTHER PUBLICATIONS

Standard ECMA-34-, "Near Field Communication Interface and Protocol (FCIP-1)," 2nd Edition, Dec. 2004, ECMA (32 pages).

(Continued)

*Primary Examiner* — Gennadiy Tsvey
(74) *Attorney, Agent, or Firm* — K&L Gates LLP

(57) ABSTRACT

A communication apparatus capable of fully exhibiting capabilities that are inherently possessed by the communication apparatus for performing near field communication, a communication method for use therewith, and a program for use therewith an initiator performs near field communication with a target in accordance with NFCIP-1 are provided. For example, for each of predetermined n+1 types of capabilities possessed by the initiator or the target, the initiator generates capsules [0] to [n] containing one or more pieces of information related to a corresponding capability (S61). Next, the initiator generates a command ATR_REQ containing the generated capsules [0] to [n] (S62 to S64). Then, the initiator transmits the command ATR_REQ to the target. The present invention can be applied to, for example, an IC card system.

24 Claims, 22 Drawing Sheets

COMMUNICATION SYSTEM

(56) References Cited

FOREIGN PATENT DOCUMENTS

| WO | 00/41333 | 7/2000 |
| WO | 01/39481 | 5/2001 |
| WO | 2004/056005 | 7/2004 |
| WO | WO 2004056005 A1 * | 7/2004 |

OTHER PUBLICATIONS

International Search Report dated Apr. 4, 2006 (10 pages).
European Patent Office, Extended European Search Report issued in connection with European Patent Application No. 06712475.0, dated Nov. 8, 2012. (6 pages).

* cited by examiner

COMMUNICATION SYSTEM

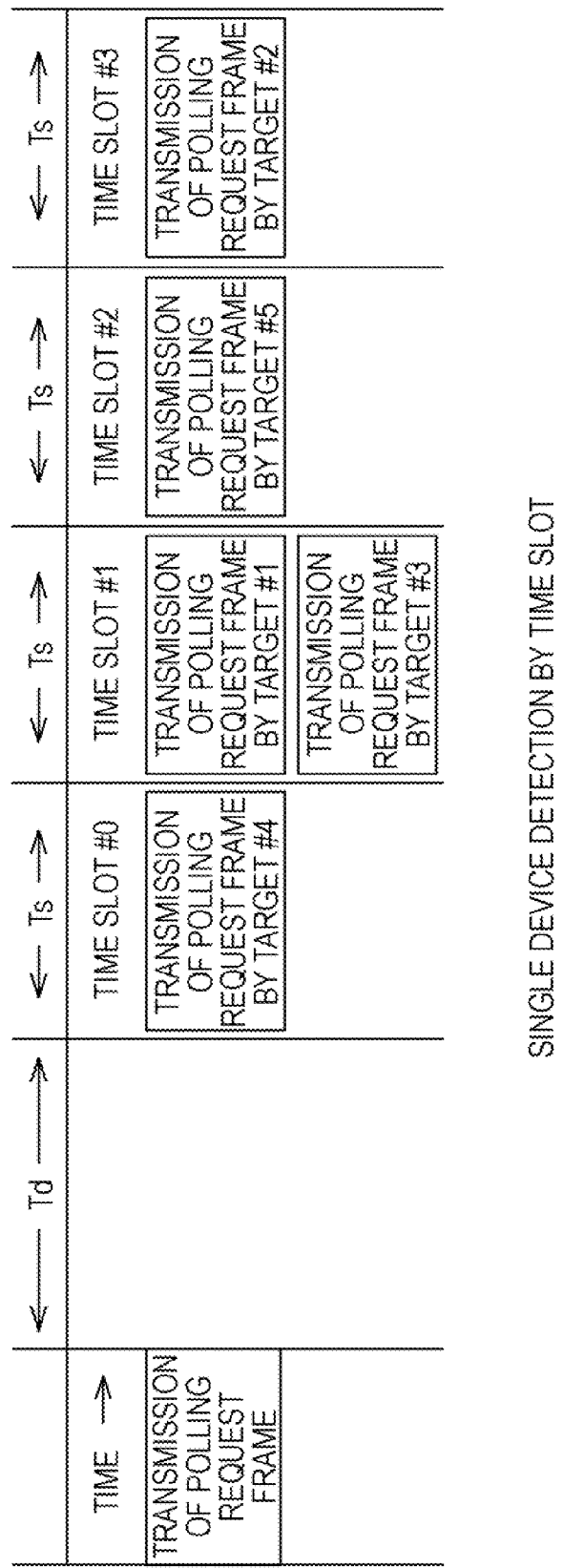

FIG. 8

NFCIP-1 PROTOCOL COMMAND SET

| NAME | DEFINITION |
|---|---|
| ATR_REQ | Attribute Request (TRANSMITTED BY INITIATOR) |
| ATR_RES | Attribute Response (TRANSMITTED BY TARGET) |
| WUP_REQ | Wakeup Request (TRANSMITTED BY INITIATOR ONLY IN ACTIVE MODE) |
| WUP_RES | Wakeup Response (TRANSMITTED BY TARGET ONLY IN ACTIVE MODE) |
| PSL_REQ | Parameter Selection Request (TRANSMITTED BY INITIATOR) |
| PSL_RES | Parameter Selection Response (TRANSMITTED BY TARGET) |
| DEP_REQ | Data Exchange Protocol Request (TRANSMITTED BY INITIATOR) |
| DEP_RES | Data Exchange Protocol Response (TRANSMITTED BY TARGET) |
| DSL_REQ | Deselect Request (TRANSMITTED BY INITIATOR) |
| DSL_RES | Deselect Response (TRANSMITTED BY TARGET) |
| RLS_REQ | Release Request (TRANSMITTED BY INITIATOR) |
| RLS_RES | Release Response (TRANSMITTED BY TARGET) |

FLOW OF INITIALIZATION AND SDD

FIG. 13

| CMD 0 | CMD 1 | Byte 0 | ... | Byte 9 | Byte 10 | Byte 11 | Byte 12 | Byte 13 | Byte 14 | ... | Byte n + 14 |
|---|---|---|---|---|---|---|---|---|---|---|---|
| (D4) | (00) | nfcid3i0 | ... | nfcid3i9 | DIDi | BSi | BRi | PPi | [Gi[0]] | ... | [Gi[n]] |

ATR_REQ

FIG. 14

| bit 7 | bit 6 | bit 5 | bit 4 | bit 3 | bit 2 | bit 1 | bit 0 |
|---|---|---|---|---|---|---|---|
| ZERO | ZERO | ZERO | ZERO | DSi | DSi | DSi | DSi |

BSi

FIG. 15

| Communication Mode | kbps | Divisor D |
|---|---|---|
| Active or Passive | 106 | 1 |
| Active or Passive | 212 | 2 |
| Active or Passive | 424 | 4 |
| Active | 847 | 8 |
| Active | 1695 | 16 |
| Active | 3390 | 32 |
| Active | 6780 | 64 |

FIG. 16

| bit 7 | bit 6 | bit 5 | bit 4 | bit 3 | bit 2 | bit 1 | bit 0 |
|---|---|---|---|---|---|---|---|
| ZERO | ZERO | LRi | LRi | ZERO | ZERO | Gi | NAD |

PPi

FIG. 17

| LRi | LEN$_{MAX}$ |
|---|---|
| 00 | Only Byte 0 to Byte 63 is valid in the Transport Data |
| 01 | Only Byte 0 to Byte 127 is valid in the Transport Data |
| 10 | Only Byte 0 to Byte 191 is valid in the Transport Data |
| 11 | Only Byte 0 to Byte 255 is valid in the Transport Data |

FIG. 19

| CMD 0 | CMD 1 | Byte 0 | ... | Byte 9 | Byte 10 | Byte 11 | Byte 12 | Byte 13 | Byte 14 | ... | Byte n + 14 |
|---|---|---|---|---|---|---|---|---|---|---|---|
| (D4) | (00) | nfcid3i0 | ... | nfcid3i9 | DIDi | BSi | BRi | PPi | [Gi[0]] | ... | [Gi[n]] |

ATR_RES

COMMUNICATION APPARATUS, COMMUNICATION METHOD, AND PROGRAM

CROSS REFERENCE TO RELATED APPLICATIONS

The present application claims priority to Japanese Patent Document Nos. 2005-023434 filed on Jan. 31, 2005, the disclosure of which is herein incorporated by reference.

BACKGROUND

The present invention relates to a communication apparatus, a communication method, and a program and relates to, for example, a communication apparatus capable of fully exhibiting capabilities that are inherently possessed by the communication apparatus for performing near field communication, a communication method for use therewith, and a program for use therewith.

As a system for performing near field communication, for example, an IC (Integrated Circuit) card system is widely known. In the IC card system, a reader/writer generates an electromagnetic wave, thereby forming a so-called RF (Radio Frequency) field (magnetic field). Then, when an IC card approaches the reader/writer, the IC card receives supply of power by electromagnetic induction and also data is transmitted between the reader/writer and the IC card.

As a communication protocol for performing near field communication typified by that of such an IC card system, for example, NFCIP (Near Field Communication Interface and Protocol)-1 is known. NFCIP-1 is also defined as ISO/IEC 18092.

For NFCIP-1, the following modes are defined: an active mode that is a communication mode in which each of a plurality of communication apparatuses for transmitting and receiving data outputs an electromagnetic wave, modulates the electromagnetic wave, and thereby transmits data, and a passive mode that is a communication mode in which data is transmitted by load-modulating an electromagnetic wave output by one communication apparatus among the other communication apparatuses of the plurality of communication apparatuses. A plurality of communication apparatuses in compliance with NFCIP-1 perform communication in one of the communication modes of the active mode and the passive mode (refer to, for example, Patent Document 1 and Non-Patent Document 1).

[Patent Document 1] Japanese Unexamined Patent Application Publication No. 2004-215225
[Non-Patent Document 1] Standard ECMA-340, "Near Field Communication Interface and Protocol (NFCIP-1)", 2nd Edition, December 2004, ECMA However, when a plurality of communication apparatuses perform communication in compliance with NFCIP-1, there is a problem in that, even if at least one of a plurality of communication apparatuses inherently has capabilities greater than a group of capabilities defined by NFCIP-1, it is difficult for the apparatus to fully exhibit capabilities that are inherently possessed.

SUMMARY

The present invention has been made in view of such circumstances, and aims to enable capabilities that are inherently possessed by a communication apparatus for performing near field communication to be fully exhibited.

MEANS FOR SOLVING THE PROBLEMS

A communication apparatus according to the present invention is a communication apparatus for performing communication with another communication apparatus that is a communication party in accordance with a communication protocol in which one or more commands and one or more responses are at least defined, the communication apparatus including: communication means for performing communication in one of communication modes of an active mode, which is a communication mode in which each of a plurality of apparatuses for transmitting and receiving data outputs an electromagnetic wave, modulates the electromagnetic wave, and thereby transmits data; and a passive mode, which is a communication mode in which one apparatus among a plurality of apparatuses outputs an electromagnetic wave, modulates the electromagnetic wave, and thereby transmits data, and the other apparatuses among the plurality of apparatuses transmit data by load-modulating the electromagnetic wave output by the one apparatus; control means for performing control such that a data group containing one or more pieces of information related to one predetermined type of capability possessed by the communication apparatus or the other communication apparatus is generated for each type of capability, and the one or more generated data groups, with the one or more generated data groups being stored in predetermined one of the one or more commands and the one or more responses defined by the communication protocol, are transmitted to the other communication apparatus.

The communication protocol further defines attributes that should be or can be possessed by the communication apparatus and the other communication apparatus, at least defines an attribute command for notifying or requesting the communication party of the attributes as one of the one or more commands, and at least defines an attribute response to the attribute command as one of the one or more commands, and the control means can perform control such that the data group containing one or more pieces of information related to the corresponding type of the capability is generated for each of the n+1 types (n is an integer of 0 or more) of capabilities differing from the types defined as the attributes in the communication protocol, and the generated n+1 data groups, with the generated n+1 data groups being stored in the attribute command or the attribute response, are transmitted to the other communication apparatus.

The control means can perform control so that the data group containing at least information indicating a level that is or can be possessed by the communication apparatus is generated for each of the n+1 types of capabilities, and the generated n+1 data groups, with the generated n+1 data groups being stored in the attribute command, are transmitted to the other communication apparatus.

The control means can perform control such that the data group containing at least an instruction for notifying the communication apparatus of the level of the corresponding type of capability that is possessed or can be possessed by the other communication apparatus is generated for each of the n+1 types of capabilities, and the generated n+1 data groups, with the generated n+1 data groups being stored in the attribute command, are transmitted to the other communication apparatus.

When the other communication apparatus generate, for each of the n+1 types of capabilities, a data group containing at least an instruction for notifying the other communication apparatus of the level that is possessed or can be possessed by the communication apparatus, and the generated n+1 data groups, with the generated n+1 data groups being stored in the attribute command, are transmitted to the communication apparatus, the control means can further perform control such that the attribute command is received by the communication apparatus, and can perform control such that, on the basis of the instruction contained in each of the n+1 data groups stored in the received attribute command, a data group containing at least information indicating the level of the corresponding type of capability that is or can be possessed by the communication apparatus, is generated for each of the n+1 types of capabilities, and the generated n+1 data groups, with the generated n+1 data groups being stored in the attribute response, are transmitted to the other communication apparatus.

The control means can perform control so that a data group containing at least an instruction instructing that the other communication apparatus activate the corresponding type of capability is generated for each of the n+1 types of capabilities, and the generated n+1 data groups, with the generated n+1 data groups being stored in the attribute command, are transmitted to the other communication apparatus.

When the other communication apparatus generate, for each of the n+1 types of capabilities, a data group containing at least an instruction instructing that the other communication apparatus activate the corresponding capability, and the generated n+1 data groups, with the generated n+1 data groups being stored in the attribute command, are transmitted to the communication apparatus, the control means can further perform control such that the attribute command is received by the communication apparatus, can further perform control for activating each of the n+1 types of capabilities on the basis of the instruction contained in each of the n+1 data groups stored in the received attribute command, and can further perform control such that a data group containing at least information indicating the result of the activation of the corresponding type of capability is generated for each of the n+1 types of capabilities, and the generated n+1 data groups, with the generated n+1 data groups being stored in the attribute response, are transmitted to the other communication apparatus.

One type among one or more types of capabilities identified by information contained in each of the one or more data groups stored in the command or the response can be a capability for controlling the power of an electromagnetic wave output by the communication apparatus or the other communication apparatus.

A communication method according to the present invention is a communication method for use with a communication apparatus for performing communication with another communication apparatus that is a communication party in accordance with a communication protocol in which one or more commands and one or more responses are at least defined, the communication method including steps of: performing communication with another communication apparatus that is a communication party in accordance with a communication protocol in which communication is performed in one of communication modes of an active mode, which is a communication mode in which each of a plurality of apparatuses for transmitting and receiving data outputs an electromagnetic wave, modulates the electromagnetic wave, and thereby transmits data; and a passive mode, which is a communication mode in which one apparatus among a plurality of apparatuses outputs an electromagnetic wave, modulates the electromagnetic wave, and thereby transmits data, the other apparatuses among the plurality of apparatuses transmit data by load-modulating the electromagnetic wave output by the one apparatus, and one or more commands and one or more responses are at least defined; performing control such that a data group containing one or more pieces of information related to one predetermined type of capability possessed by the communication apparatus or the other communication apparatus is generated for each type of the capabilities and the one or more generated data groups, with the one or more generated data groups being stored in predetermined one of the one or more commands and the one or more responses defined by the communication protocol, are transmitted to the other communication apparatus.

A program according to the present invention is a program that is executed by a computer for controlling a communication apparatus for performing communication with another communication apparatus that is a communication party in accordance with a communication protocol in which communication is performed in one of communication modes of an active mode, which is a communication mode in which each of a plurality of apparatuses for transmitting and receiving data outputs an electromagnetic wave, modulates the electromagnetic wave, and thereby transmits data; and a passive mode, which is a communication mode in which one apparatus among a plurality of apparatuses outputs an electromagnetic wave, modulates the electromagnetic wave, and thereby transmits data, and the other apparatuses among the plurality of apparatuses transmit data by load-modulating the electromagnetic wave output by the one apparatus, and one or more commands and one or more responses are at least defined, the program including: a control step of performing control such that a data group containing one or more pieces of information related to predetermined one type of capability possessed by the communication apparatus or the other communication apparatus is generated for each type of the capabilities, and the one or more generated data groups, with the one or more generated data groups being stored in predetermined one of the one or more commands and the one or more responses defined by the communication protocol, are transmitted to the other communication apparatus.

In the communication apparatus, the communication method, and the program according to the present invention, in one of the active mode, which is a communication mode in which each of a plurality of apparatuses for transmitting and receiving data outputs an electromagnetic wave and data is transmitted by modulating the electromagnetic wave, and the passive mode, which is a communication mode in which data is transmitted by load-modulating an electromagnetic wave output by one apparatus among the other apparatuses of the plurality of apparatuses. Furthermore, communication is performed among a communication apparatus and other apparatuses that are communication parties thereof in accordance with a communication protocol in which one or more commands or one or more responses are at least defined. More specifically, a data group containing one or more pieces of information related to one predetermined type of capabilities possessed by the communication apparatus or the other NFC communication apparatuses is generated for each type of the capabilities, and the generated one or more data groups, the generated one or more data groups being stored in predetermined one of one or more commands and one or more responses that are defined by a communication protocol, are transmitted to the other NFC communication apparatuses.

ADVANTAGES

According to the present invention, it is possible for a communication apparatus to perform near field communication with the other communication apparatus. In particular, it is possible for the apparatus to fully exhibit capabilities that are inherently possessed by the communication apparatus for performing near field communication.

Additional features and advantages of the present invention are described in, and will be apparent from, the following Detailed Description and the Figures.

BRIEF DESCRIPTION OF THE FIGURES

FIG. 7 illustrates an SDD process.

FIG. 8 shows a list of commands and responses.

FIG. 13 illustrates the structure of a command ATR_REQ.

FIG. 14 illustrates the structure of a field BSi of a command ATR_REQ.

FIG. 15 illustrates a transmission rate that can be set in the field BSi or a field BRi of command ATR_REQ.

FIG. 16 illustrates the structure of a field PPi of the command ATR_REQ.

FIG. 17 illustrates information LRi that can be set in bit 4 of the field PPi of the command ATR_REQ.

FIG. 19 illustrates the structure of a response ATR_RES.

Figure 1:
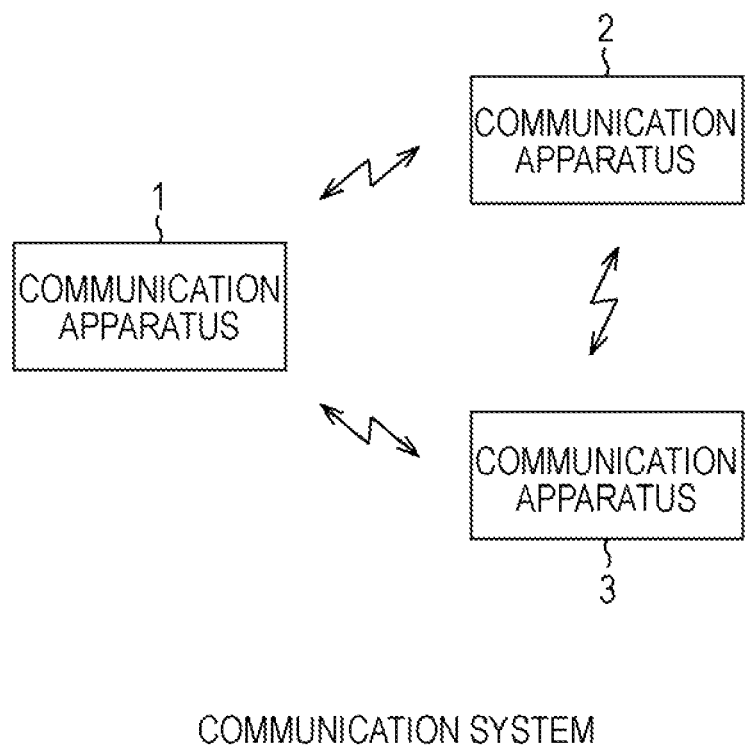
FIG. 1 shows an example of the configuration of an embodiment of a communication system to which the present invention is applied.

REFERENCE NUMERALS 1 to 3 NFC communication apparatus, 11 antenna, 12 receiver, 13 demodulator, 14 decoder, 15 data processor, 16 encoder, 17 selector, 18 electromagnetic wave output section, 19 modulator, 20 load modulator, 21 controller, 21A CPU, 21B EEPROM, 22 power-supply unit, 51 capsule, 61 to 65 field

DETAILED DESCRIPTION

Embodiments of the present invention will be described below with reference to the drawings.

FIG. 1 shows an example of the configuration of an embodiment of a communication system (the system designates a logical assembly of a plurality of devices, and it does not matter whether each device is in the same housing) to which the present invention is applied.

In FIG. 1, the communication system is constituted by three NFC communication apparatuses 1, 2, and 3. Each of the NFC communication apparatuses 1 to 3 is designed to be capable of performing near field communication (NFC (Near Field Communication)) by electromagnetic induction using a carrier wave of a single frequency with other NFC communication apparatuses.

At this point, examples of a frequency of a carrier wave used by the NFC communication apparatuses 1 to 3 include 13.56 MHz of an ISM (Industrial Scientific Medical) band.

The phrase near field communication means communication that becomes possible when the distance between apparatuses that perform communication becomes within several 10 cm, and also includes communication performed with (the housings of) apparatuses that perform communication being brought into contact with each other.

The communication system of FIG. 1 can be adopted as an IC card system in which one or more of the NFC communication apparatuses 1 to 3 can be made to be a reader/writer and the other one or more can be made to be an IC card. Also, each of the NFC communication apparatuses 1 to 3 can be adopted as a communication system of a PDA (Personal Digital Assistant), a PC (Personal Computer), a mobile phone, a wrist watch, a pen, and the like. That is, the NFC communication apparatuses 1 to 3 are apparatuses that perform near field communication and are not limited to an IC card, a reader/writer, and the like of the IC card system.

The NFC communication apparatuses 1 to 3 are capable of performing communication in two communication modes. Examples of the two communication modes include a passive mode and an active mode. For example, communication between the NFC communication apparatuses 1 and 2 among the NFC communication apparatuses 1 to 3 will now be considered. In the passive mode, similarly to the above-described IC card system of the related art, for example, the NFC communication apparatus 1, which is one of the NFC communication apparatuses 1 and 2, modulates (a carrier wave corresponding to) an electromagnetic wave generated by itself and thereby transmits data to the NFC communication apparatus 2 that is the other NFC communication apparatus, and the NFC communication apparatus 2 load-modulates (a carrier wave corresponding to) the electromagnetic wave generated by the NFC communication apparatus 1 and thereby transmits data to the NFC communication apparatus 1.

On the other hand, in the active mode, each of the NFC communication apparatuses 1 and 2 modulates (a carrier wave corresponding to) an electromagnetic wave generated by itself and thereby transmits data.

At this point, when near field communication employing electromagnetic induction is to be performed, an apparatus that starts communication by outputting an electromagnetic wave first, that is, an apparatus that, so to speak, takes the initiative of communication, will be referred to as an initiator. Near field communication is performed in such a manner that the initiator transmits a command to a communication party thereof, and the communication party sends back a response to the command. The communication party that sends back a response to the command from the initiator will be referred to as a target.

Figure 2:
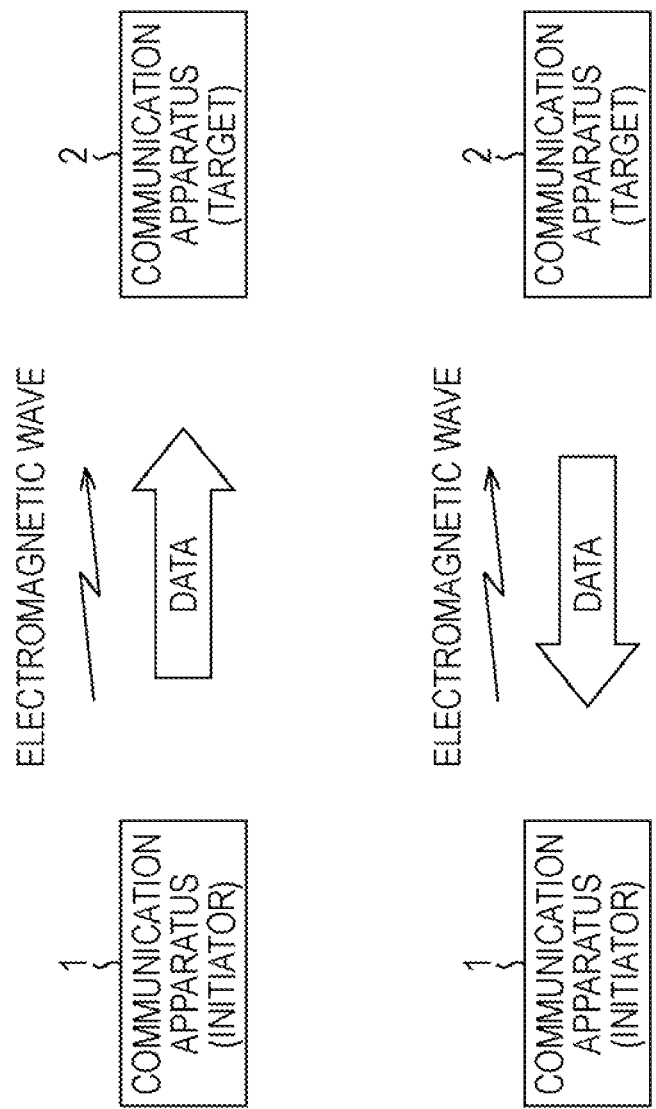
FIG. 2 illustrates a passive mode.
Figure 3:
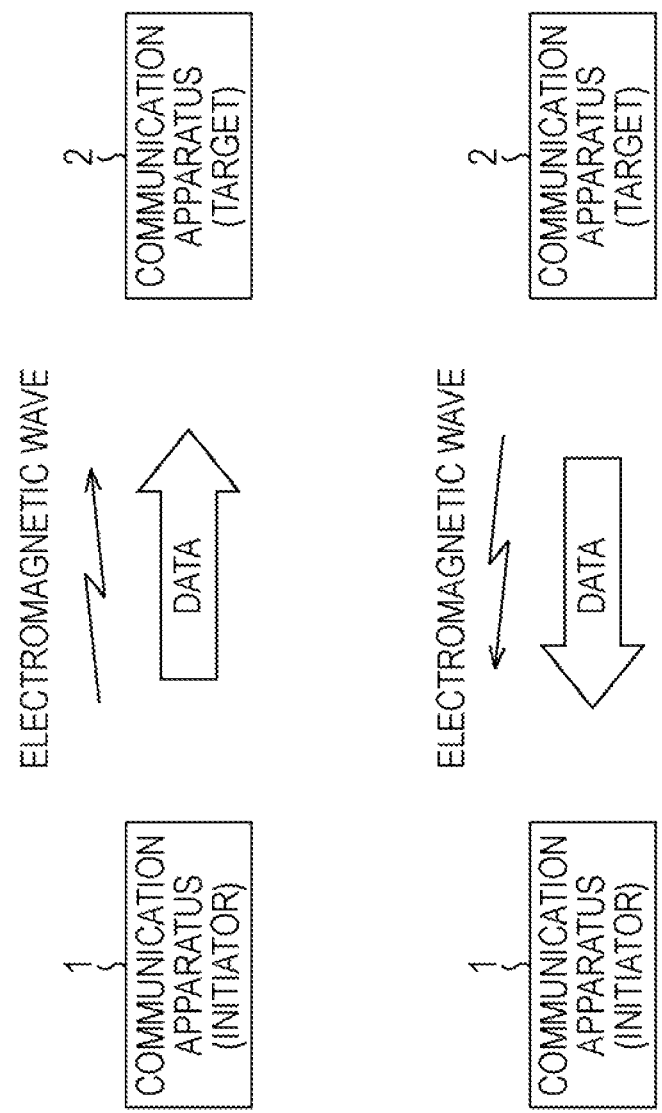
FIG. 3 illustrates an active mode.

For example, it is assumed that the NFC communication apparatus 1 starts to output an electromagnetic wave and starts communicating with the NFC communication apparatus 2. As shown in FIGS. 2 and 3, the NFC communication apparatus 1 becomes an initiator, and the NFC communication apparatus 2 becomes a target.

In the passive mode, as shown in FIG. 2, the NFC communication apparatus 1 that is an initiator continues to output an electromagnetic wave. The NFC communication apparatus 1 modulates the electromagnetic wave output by itself, and thereby transmits data to the NFC communication apparatus 2 that is a target. Also, the NFC communication apparatus 2 load-modulates the electromagnetic wave output by the NFC communication apparatus 1 that is an initiator and thereby transmits data to the NFC communication apparatus 1.

On the other hand, as shown in FIG. 3, in the active mode, when the NFC communication apparatus 1, which is an initiator of itself, transmits data, the NFC communication apparatus 1 starts to output an electromagnetic wave, modulates the electromagnetic wave, and thereby transmits data to the NFC communication apparatus 2 that is a target. Then, after the transmission of data is completed, the NFC communication apparatus 1 stops outputting the electromagnetic wave. Also, when the NFC communication apparatus 2, which is a target, transmits data, the NFC communication apparatus 2 starts to output an electromagnetic wave, and modulates the electromagnetic wave, and thereby transmits data to the NFC communication apparatus 2, which is a target. Then, after the transmission of data is completed, the NFC communication apparatus 2 stops outputting the electromagnetic wave.

In FIG. 1, the communication system is constituted by three NFC communication apparatuses 1 to 3. However, the number of NFC communication apparatuses constituting the communication system is not limited to 3, and may be 2 or 4 or more. Furthermore, the communication system can include, in addition to an NFC communication apparatus, for example, an IC card, a reader/writer, and the like constituting an IC card system of the related art.

Figure 4:
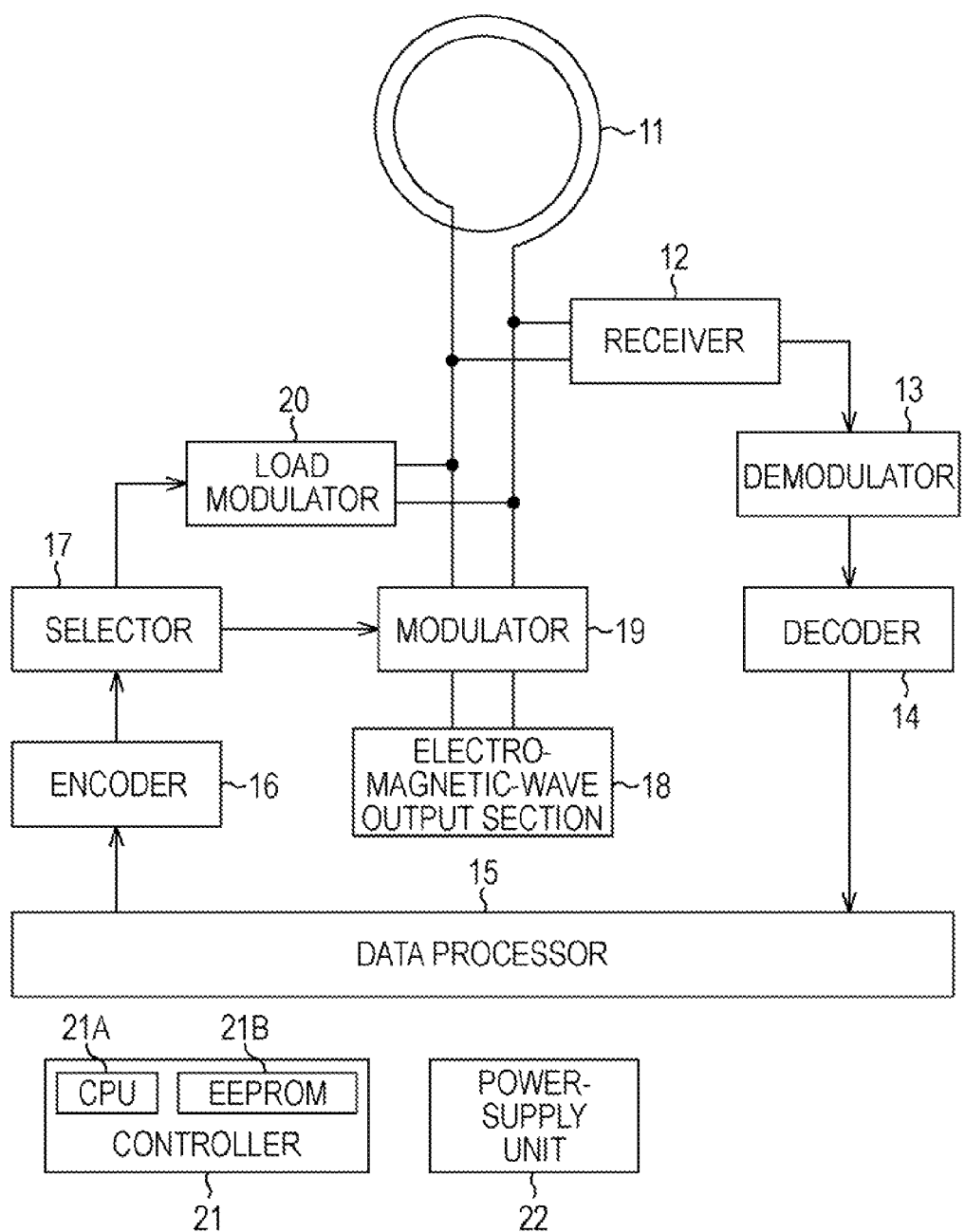
FIG. 4 is a block diagram showing an example of the configuration of an NFC communication apparatus 1.

Next, FIG. 4 shows an example of the configuration of the NFC communication apparatus 1 of FIG. 1. The other NFC communication apparatuses 2 and 3 of FIG. 1 are configured similarly to the NFC communication apparatus 1 of FIG. 4, and accordingly, a description thereof is omitted.

An antenna 11 is configured to include a coil of a closed loop, and outputs an electromagnetic wave as a result of electrical current flowing through the coil being changed. Furthermore, as a result of magnetic fluxes passing through the coil as the antenna 11 being changed, electrical current flows through the antenna 11.

A receiver 12 receives electrical current flowing through the antenna 11, and perform tuning and detection, and outputs a signal to a demodulator 13. The demodulator 13 demodulates the signal supplied from the receiver 12 and supplies the demodulated signal to a decoder 14. The decoder 14 decodes, for example, a Manchester code or the like as a signal supplied from the demodulator 13, and supplies data obtained by the decoding to a data processor 15.

The data processor 15 performs predetermined processing based on the data supplied from the decoder 14. Also, the data processor 15 supplies an encoder 16 with data to be transmitted to another apparatus.

The encoder 16 encodes the data supplied from the data processor 15 into, for example, a Manchester code, and supplies the code to a selector 17. The selector 17 selects either a modulator 19 or a load modulator 20, and outputs the signal supplied from the encoder 16 to the selected unit.

At this point, under the control of a controller 21, the selector 17 selects the modulator 19 or the load modulator 20. The controller 21 controls the selector 17 to select the load modulator 20 when the communication mode is a passive mode, and the NFC communication apparatus 1 is a target. Also, when the communication mode is an active mode or when the communication mode is a passive mode and the NFC communication apparatus 1 is an initiator, the controller 21 controls the selector 17 to select the modulator 19. Accordingly, the signal output by the encoder 16 is supplied to the load modulator 20 through the selector 17 when the communication mode is a passive mode and the NFC communication apparatus 1 is a target, and is supplied to the modulator 19 through the selector 17 in other cases.

An electromagnetic wave output section 18 supplies the antenna 11 with electric current for allowing the antenna 11 to radiate (electromagnetic waves of) a carrier wave having a predetermined single frequency. In accordance with the signal supplied from the selector 17, the modulator 19 modulates the carrier wave as the electric current supplied to the antenna 11 by the electromagnetic wave output section 18. This allows the antenna 11 to radiate carrier-modulated electromagnetic waves in accordance with data output to the encoder 16 by the data processor 15.

The load modulator 20 changes, in accordance with the signal supplied from the selector 17, an impedance obtained when the coil as the antenna 11 is externally observed. When an RF field (magnetic field) is formed around the antenna 11 as a result of another apparatus outputting electromagnetic waves as a carrier wave, the impedance, obtained when the coil as the antenna 11 is observed, changes, whereby the RF field around the antenna 11 also changes. This modulates (load-modulates) the carrier wave as the electromagnetic waves output by the other apparatus in accordance with the signal supplied from the selector 17, and transmits, to the other apparatus outputting the electromagnetic waves, the data output to the encoder 16 by the data processor 15.

At this point, for example, amplitude shift keying (ASK) can be employed as a modulation method in the modulator 19 and the load modulator 20. However, the modulation method in the modulator 19 and the load modulator 20 is not limited to ASK, and PSK (Phase Shift Keying), QAM (Quadrature Amplitude Modulation), etc., can be employed. The modulation factor of the amplitude is not limited to numerical values, such as 8% to 30%, 50%, and 100%, and a suitable value may be selected.

The controller 21 controls blocks constituting the NFC communication apparatus 1. That is, the controller 21 is constituted by, for example, a CPU (Central Processing Unit) 21A, an EEPROM (Electrically and Erasable Programmable Read Only Memory) 21B, a RAM (Random Access Memory) (not shown), and others. The CPU 21A executes a program stored in the EEPROM 21B. As a result, control of blocks constituting the NFC communication apparatus 1 and other various kinds of processing are performed. The EEPROM 21B has stored therein a program to be executed by the CPU 21A and data that is necessary when the CPU 21A operates.

A series of processes performed by the CPU 21A by executing a program can be performed in such a way that dedicated hardware is provided in place of the CPU 21A and the dedicated hardware performs the processes. In addition to being installed into the EEPROM 21B in advance, a program to be executed by the CPU 21A can be temporarily or permanently stored (recorded) in a removable recording medium, such as a flexible disk, a CD-ROM (Compact Disc Read Only Memory), an MO (Magneto Optical) disk, a DVD (Digital Versatile Disc), a magnetic disk, or a semiconductor memory, and can be provided as so-called packaged software. Furthermore, the program can be transmitted to the NFC communication apparatus 1 by near field communication and can be installed into the EEPROM 21B.

A power-supply unit 22 supplies necessary power to the blocks constituting the NFC communication apparatus 1. In FIG. 4, representation of lines showing that the controller 21 controls the blocks constituting the NFC communication apparatus 1, and representation of lines showing that the power-supply unit 22 supplies power to the NFC communication apparatus 1 complicate FIG. 4. Accordingly, the representations are omitted. The power-supply unit 22 may have incorporated therein a battery, or may obtain power that becomes a power source from the electrical current flowing through the antenna 11 without incorporating a battery. However, in the latter case, the NFC communication apparatus 1 operates as only the target in the passive mode.

Although, in the above case, the decoder 14 and the encoder 16 can process the Manchester code, the decoder 14 and the encoder 16 can selectively process not only the Manchester code, but also one of plural types of codes such as modified Miller code and NRZ (Non Return to Zero) code.

Next, all the NFC communication apparatuses 1 to 3 can become initiators that output an electromagnetic wave first and starts communication. Furthermore, in the active mode, in both cases in which the NFC communication apparatuses 1 to 3 are initiators or targets, they output an electromagnetic wave by themselves.

Therefore, when two or more of the NFC communication apparatuses 1 to 3 output electromagnetic waves at the same time in which the NFC communication apparatuses 1 to 3 are in proximity with one another, collisions occur, and communication cannot be performed.

Therefore, each of the NFC communication apparatuses 1 to 3 detects whether or not (an RF field by) an electromagnetic wave from other apparatuses exists. Only when the electromagnetic wave does not exist, the NFC communication apparatus starts to output an electromagnetic wave, thereby preventing collisions. Here, processing in which whether or not an electromagnetic wave from other apparatuses exist is detected and only when it does not exist, the output of an electromagnetic wave is started is called an RFCA (RF Collision Avoidance) process from the purpose of preventing collisions.

There are two types of RFCA process: an initial RFCA process that is performed first by the NFC communication apparatuses (in FIG. 1, one or more of the NFC communication apparatuses 1 to 3) that are going to become initiators; and a response RFCA process that is performed each time an NFC communication apparatus starts to output an electromagnetic wave during communication in the active mode. The initial RFCA process and the response RFCA process are the same in that, before the output of an electromagnetic wave is started, whether or not an electromagnetic wave from other apparatuses exists is detected, and only when it does not exist, the output of the electromagnetic wave is started. However, between the initial RFCA process and the response RFCA process, a time period until a timing at which the output of an electromagnetic wave needs to be started after the presence of the electromagnetic wave output by the other apparatuses is no longer detected differs.

The initial RFCA process will be described first with reference to FIG. 5.

Figure 5:
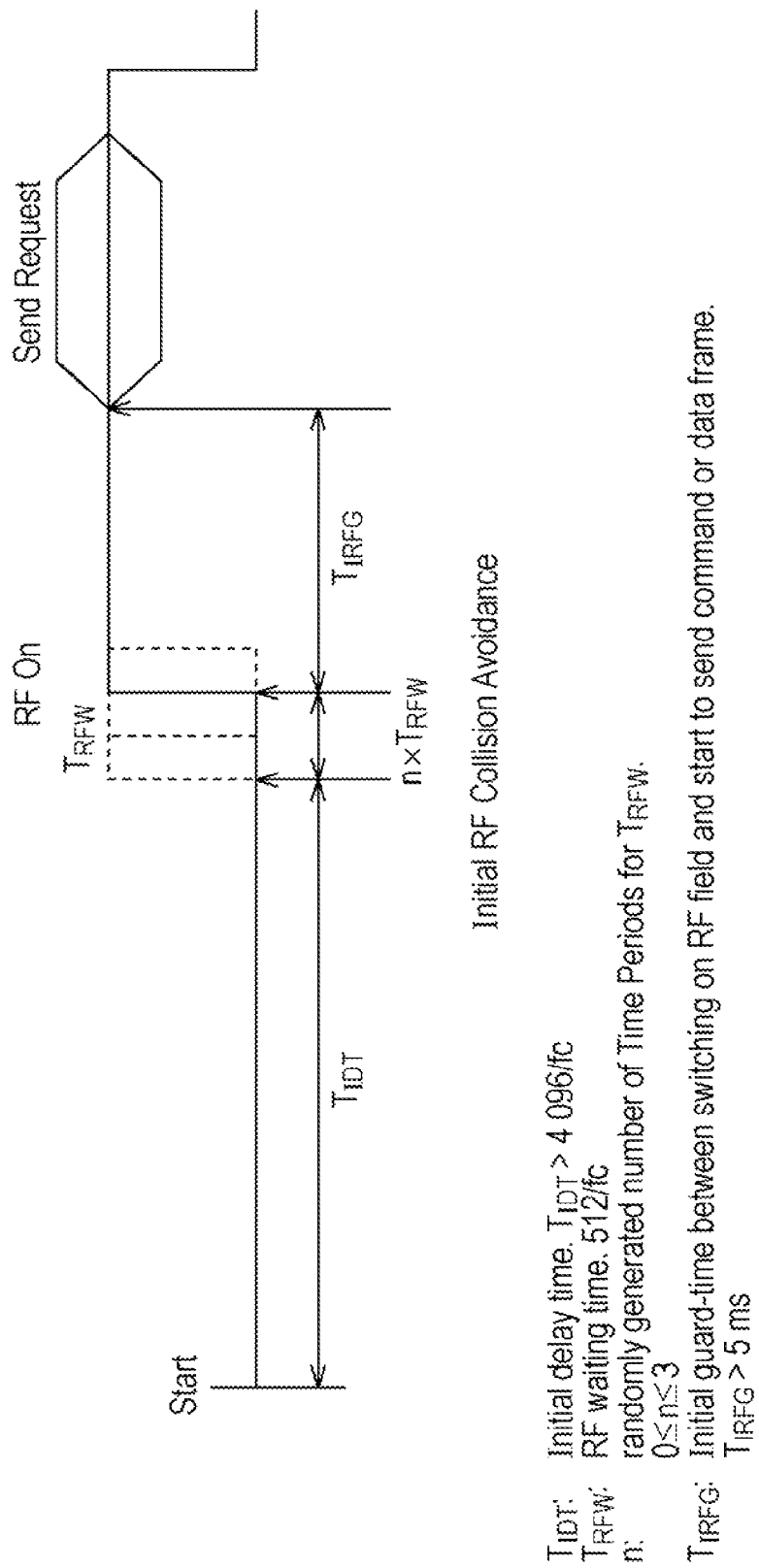
FIG. 5 is a timing chart illustrating an initial RFCA process.

FIG. 5 shows an electromagnetic wave whose output is started by the initial RFCA process. In FIG. 5 (the same applies to FIG. 6 described later), the horizontal axis indicates time, and the vertical axis indicates the level of an electromagnetic wave output by the NFC communication apparatus.

The NFC communication apparatus that is going to be an initiator always detects an electromagnetic wave from another apparatus. When an electromagnetic wave from another apparatus is not detected continuously for a time period $T_{IDT}+n \times T_{RFW}$, the NFC communication apparatus starts to output an electromagnetic wave and starts transmission (Send Request) of data (including a command) after a time period $T_{IRFG}$ has passed after the output.

At this point, $T_{IDT}$ in the time period $T_{IDT}+n \times T_{RFW}$ is called an initial delay time period. When the frequency of the carrier wave is denoted as $f_c$, a value greater than, for example, $4096/f_c$, is used therefor. n is an integer of, for example, of 0 to 3, and is generated using a random number. $T_{RFW}$ is called an RF waiting time and, for example, $512/f_c$ is used. The time $T_{IRFG}$ is called an initial guard time and, for example, a value greater than 5 ms is used.

By using n, which is a random number, for the time period $T_{IDT}+n \times T_{RFW}$ during which an electromagnetic wave should not be detected, the possibility that a plurality of NFC communication apparatuses start to output an electromagnetic wave at the same timing is reduced.

When the NFC communication apparatus starts to output an electromagnetic wave by the initial RFCA process, the NFC communication apparatus becomes an initiator. In that case, when the active mode is set as a communication mode, the NFC communication apparatus that has become an initiator stops outputting the electromagnetic wave after the transmission of the data of the NFC communication apparatus is completed. On the other hand, when the passive mode is set as a communication mode, the NFC communication apparatus that has become an initiator continues, as it is, the output of the electromagnetic wave started by the initial RFCA process until the communication with the target completely ends.

Figure 6:
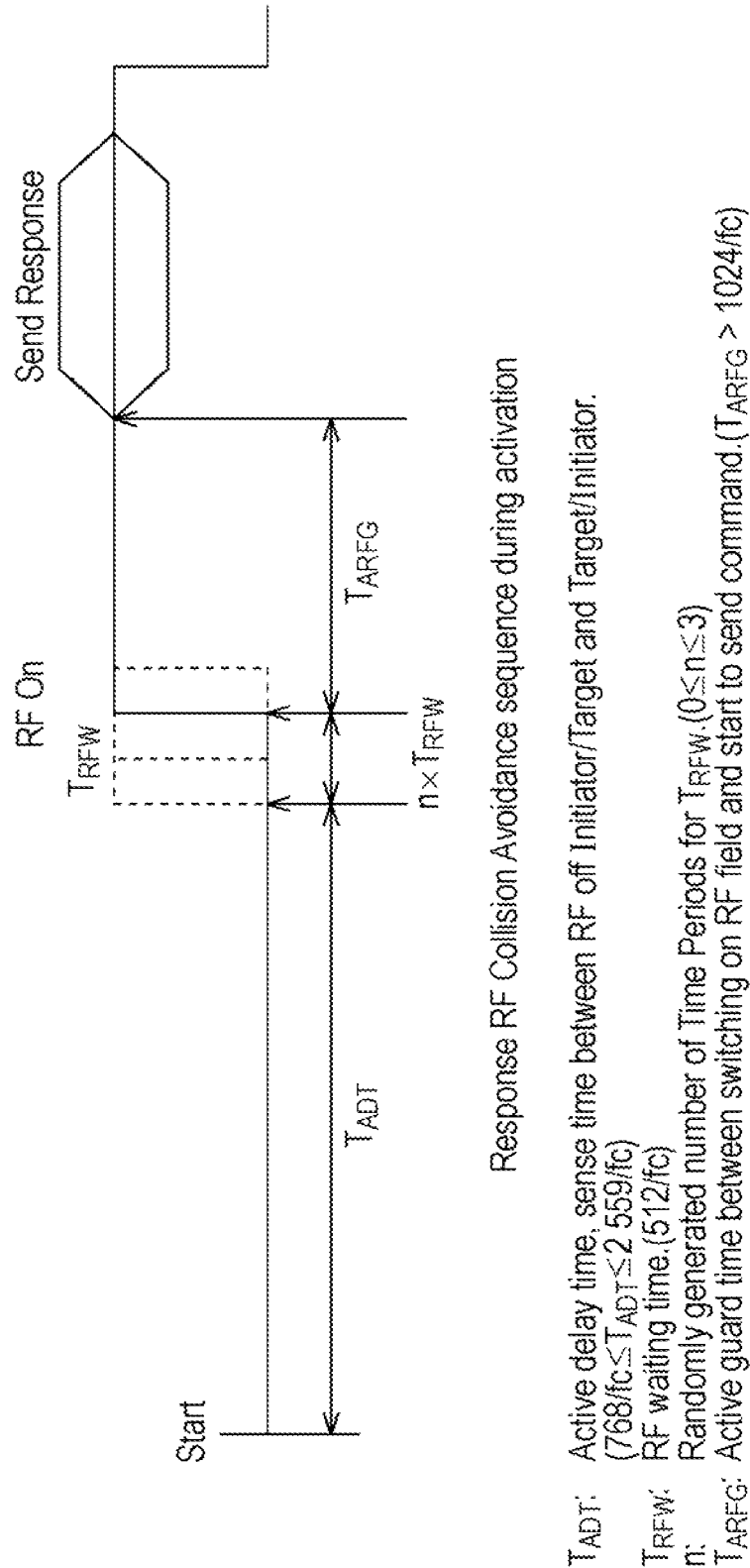
FIG. 6 is a timing chart illustrating an active RFCA process.

Next, FIG. 6 shows an electromagnetic wave whose output is started by a response RFCA process.

The NFC communication apparatus that is going to output an electromagnetic wave in the active mode detects an electromagnetic wave from another apparatus. When an electromagnetic wave from the other apparatus is not detected continuously for a time period $T_{ADT}+n \times T_{RFW}$, the NFC communication apparatus starts to output an electromagnetic wave, and starts the transmission (Send Responses) of data after an elapse of a time $T_{ARFG}$ from the output.

n and $T_{RFW}$ in the time period $T_{ADT}+n \times T_{RFW}$ are the same as those in the case of the initial RFCA process of FIG. 5. $T_{ADT}$ in the time period $T_{ADT}+n \times T_{RFW}$ is called an active delay time, and a value of, for example, greater than or equal to $768/f_c$ and smaller than or equal to $2559/f_c$, is used. The time $T_{ARFG}$ is called an active guard time, and a value of, for example, greater than $1024/f_c$, is used.

As is clear from FIGS. 5 and 6, in order to start to output an electromagnetic wave by the initial RFCA process, an electromagnetic wave should not exist during at least the initial delay time $T_{IDT}$, and in order to start to output an electromagnetic wave by the response RFCA process, an electromagnetic wave should not exist during at least the active delay time $T_{ADT}$.

Whereas the initial delay time $T_{IDT}$ is a value greater than $4096/f_c$, the active delay time $T_{ADT}$ is a value greater than or equal to $768/f_c$ and smaller than or equal to $2559/f_c$. Therefore, when the NFC communication apparatus is going to become an initiator, a state in which an electromagnetic wave does not exist is needed for a time period longer than that when an electromagnetic wave is output during communication in the active mode. To say reversely, when the NFC communication apparatus is going to output an electromagnetic wave during communication in the active mode, an electromagnetic wave needs to be output without taking much delay from when a state in which no electromagnetic wave exists is reached when compared with the case in which the NFC communication apparatus is going to become an initiator. This is due to the following reasons.

That is, when NFC communication apparatuses perform communication in the active mode, one of the NFC communication apparatuses outputs an electromagnetic wave by itself and transmits data, and thereafter stops the output of the electromagnetic wave. Then, the other NFC communication apparatuses start to output an electromagnetic wave and transmits data. Therefore, in the communication of the active mode, all the NFC communication apparatuses may have stopped the output of the electromagnetic wave. For this reason, when the NFC communication apparatus is going to become an initiator, in order to confirm that communication in the active mode is not being performed around that NFC communication apparatus, it is necessary to confirm, for a sufficient time period, the fact that the other apparatuses do not output an electromagnetic wave around the NFC communication apparatus that is going to become an initiator.

In comparison, in the active mode, as described above, the initiator outputs an electromagnetic wave, and thereby transmits data to the target. Then, the target starts to output an electromagnetic wave after the initiator stops the output of the electromagnetic wave, and thereby transmits data to the initiator. Thereafter, the initiator starts the output of the electromagnetic wave after the target starts the output of the electromagnetic wave, and thereby transmits data to the initiator. Hereafter, similarly, data is transmitted and received between the initiator and the target.

Therefore, when an NFC communication apparatus that is going to become an initiator exists around the initiator and the target that are performing communication in the active mode, if the time period from when one of the initiator and the target that are performing communication in the active mode stops the output of the electromagnetic wave until the other starts to output an electromagnetic wave is long, the electromagnetic wave does not exist during the time period. Therefore, the NFC communication apparatus that is going to become an initiator starts the output of the electromagnetic wave by the initial RFCA process.

In this case, the communication in the active mode, which has been performed previously, is impeded.

For this reason, in the response RFCA process that is performed during communication in the active mode, an electromagnetic wave needs to be output without taking much delay after a state in which an electromagnetic wave does not exist is reached.

Next, as described with reference to FIG. 5, the NFC communication apparatus that is going to become an initiator starts the output of the electromagnetic wave by the initial RFCA process and thereafter, transmits data. The NFC communication apparatus that is going to become an initiator starts the output of the electromagnetic wave, and thereby becomes an initiator, and an NFC communication apparatus that exists in proximity with the initiator becomes a target. In order for the initiator to transmit and receive data to and from the target, it is necessary to specify the target to and from which data is transmitted and received. For this reason, after the initiator starts the output of the electromagnetic wave by the initial RFCA process, the initiator makes a request for, for example, an NFCID (NFC Identification) determined using a random number or the like as information for specifying each target to one or more targets that exist in proximity with the initiator. Then, the target that exists in proximity with the initiator transmits an NFCID that specifies the target to the initiator in response to a request from the initiator.

The initiator identifies a target on the basis of the NFCID transmitted from the target in the manner described above, and transmits and receives data to and from the specified target.

In the active mode, the initiator transmits a command (request) ATR_REQ (to be described later), with an NFCID that specifies the initiator being contained therein, and one target sends back (transmits) a response ATR_RES (to be described later) for the command ATR_REQ, with an NFCID that specifies the target being contained therein, with the result that the initiator and the target mutually recognize their NFCID and identify each other.

On the other hand, in the passive mode, the initiator performs processing called an SDD (Single Device Detection) process, so that a target that exists around (in proximity with) the initiator is identified using the NFCID.

At this point, in the SDD process, the initiator makes a request for the NFCID of the target. This request is made by the initiator by transmitting a frame called a polling request frame. When the target receives the polling request frame, the target determines, for example, its own NFCID using a random number and transmits a frame called a polling response frame in which the NFCID is located. The initiator recognizes the NFCID of the target by receiving the polling response frame transmitted from the target.

Since the target in the passive mode transmits data by load modulation, the RFCA process is not performed. Therefore, in the SDD process, when the initiator makes a request for the NFCID to targets around the initiator, it can occur that when a plurality of targets exist around the initiator, NFCIDs are transmitted simultaneously from two or more of the targets. In this case, NFCIDs that are transmitted from the two or more targets collide one another, and it is not possible for the initiator to recognize the colliding NFCIDs.

Accordingly, the SDD processing is performed by, for example, a method using time slots in order to avoid collisions of NFCIDs as much as possible.

FIG. 7 shows an SDD processing sequence performed by a method using time slots. In FIG. 7, it is assumed that five targets #1, #2, #3, #4, and #5 exist around an initiator.

In the SDD processing, the initiator transmits a polling response frame. After completion of the transmission, time slots at intervals of a predetermined time period $T_s$ are provided after an elapse of a predetermined time period $T_d$. The time period $T_d$ is set to, for example, $512 \times 64/f_c$, and the time period $T_s$ as the time slot interval is set to, for example, $256 \times 64/f_c$. Also, the time slots are sequentially numbered (integer) from zero from, for example, the temporally preceding slot, whereby they are identified.

Although FIG. 7 shows four time slots #0, #1, #2, and #3, for example, up to sixteen time slots can be set. The number TSN of time slots, set for a certain polling response frame, is designated by the initiator, and is transmitted, with the number TSN of time slots being contained in the polling response frame, to a target.

The target receives the polling response frame transmitted from the initiator, and recognizes the number TSN of time slots. The target uses random numbers to generate an integer R in the range of zero to TSN-1, and transmits a polling response frame in which its NFCID is located, at the timing of the time slot #R determined by the integer R.

As described above, based on random numbers, the target determines time slots used as timing for transmitting polling response frames. Thus, the timing at which the targets transmit polling response frames varies. This can avoid collisions of the polling response frames transmitted by the targets as much as possible.

Even if each target determines, based on a random number, a time slot as timing for transmitting a polling response frame, time slots in which polling response frames are transmitted by a plurality of targets may coincide with one another. This may cause collisions of the polling response frames. In the embodiment in FIG. 7, a polling response frame of target #4 is transmitted in time slot #0, polling response frames of targets #1 and #3 are transmitted in time slot #1, a polling response frame of target #5 is transmitted in time slot #2, and a polling response frame of target #3 is transmitted in time slot #3, so that the collision between targets #1 and #3 occurs.

In this case, the initiator cannot normally receive the polling response frames of targets #1 and #3 between which the collision occurs. Accordingly, the initiator transmits a polling request frame again. This requests targets #1 and #3 to transmit polling response frames in which their NFCIDs are located. Subsequently, until the initiator recognizes all the NFCIDs of targets #1 to #5 around it, transmission of polling request frames by the initiator and transmission of polling response frames by the targets are repeatedly performed.

In a case in which, when the initiator transmits a polling request frame again, all the targets #1 to #5 can send back polling response frames, there is a possibility that polling response frames may collide with each other. Accordingly, in a case in which, after each target receives a polling request frame from the initiator, the target receives a polling request frame again without taking much time, for example, the target can ignore the polling request frame. However, in this case, in the embodiment in FIG. 7, regarding the targets #1 and #3, in which polling response collision occurs for the initially transmitted polling request frame, the initiator cannot recognize the NFCIDs of the targets #1 and #3. Thus, data exchange cannot be performed between the targets #1 and #3.

Accordingly, targets #2, #4, and #5, in which their polling response frames are normally received and their NFCIDs can be recognized, are temporarily excluded (placed in a deselected state) from parties among which communication is performed, whereby a polling response frame as a response to the polling request frame cannot be sent back. In this case, those which send back polling response frames to the polling request frame retransmitted by the initiator are only targets #1 and #3, whose NFCIDs cannot be recognized through the transmission of the initial polling request frame. Therefore, in this case, all the NFCIDs of targets #1 to #5 can be recognized while reducing a possibility that polling response frames may collide with each other.

In addition, here, as described above, when a polling request frame is received, the target determines (generates) its NFCID based on random numbers. Accordingly, from different targets, polling response frames with identical NFCIDs located therein may be transmitted to the initiator. When the initiator receives, in different time slots, the polling response frames with identical NFCIDs located therein, the initiator can retransmit a polling request frame, for example, similarly to a case in which polling response frames collide with each other.

As described above, according to NFC communication apparatuses, even between an IC card and a reader/writer constituting the existing IC card system, data can be exchanged at transmission rates employed by the IC card and the reader/writer. When a target is, for example, an IC card in the existing IC card system, SDD processing is performed in, for example, the following manner.

More specifically, in accordance with the initial RFCA process, an initiator starts to output an electromagnetic wave, and an IC card as a target obtains power from the electromagnetic waves and initiates processing. In other words, in this case, the target generates operating power from the electromagnetic waves output by the initiator since it is an IC card in the existing IC card system.

After obtaining the power and being operable, the target prepares for receiving a polling request frame within, for example, a maximum of 2 seconds, and waits for the polling request frame to be transmitted from the initiator.

On the other hand, the initiator can transmit a polling request frame regardless of whether or not the preparation for receiving the polling request frame is completed in the target.

When the target receives the polling request frame from the initiator, as described above, the target transmits a polling response frame to the initiator at a timing of a predetermined time slot. When the initiator successfully receives the polling response frame from the target, as described above, it recognizes the NFCID of the target. Also, when the initiator fails to normally receive the polling response frame from the target, the initiator can retransmit a polling request frame.

In this case, the target generates operating power from electromagnetic waves output by the initiator since it is an IC card in the existing IC card system. Accordingly, the initiator continues the electromagnetic wave output initiated by the initial RFCA processing until communication with the target completely ends.

Next, according to NFC communication apparatuses, communication is performed such that an initiator transmits a command to a target, and the target transmits (sends back) a response to the command from the initiator.

Accordingly, FIG. 8 shows commands that the initiator transmits to the target, and responses that the target transmits to the initiator.

In FIG. 8, those having the characters REQ after the underbar (_) represent commands, and those having the characters RES after the underbar (_) represent responses. In the embodiment in FIG. 8, six types of commands, ATR_REQ, WUP_REQ, PSL_REQ, DEP_REQ, DSL_REQ, and RLS_REQ, are available. Similarly to the commands, also six types of responses, ATR_RES, WUP_RES, PSL_RES, DEP_RES, DSL_RES, and RLS_RES, are available. As described above, an initiator transmits a command (request) to a target, and the target transmits to the initiator a response to the command. Accordingly, the command is transmitted by the initiator, and the response is transmitted by the target.

The command ATR_REQ is such that the initiator notifies the target of its attributes (specifications) and is transmitted to the target when the initiator requests target's attributes. Here, the attributes of the initiator or the target include the transmission rate of data that can be transmitted or received by the initiator or the target. In the command ATR_REQ, in addition to initiator's attributes, an NFCID identifying the initiator is located, and the target recognizes the initiator's attributes and NFCID by receiving the command ATR_REQ.

The response ATR_RES is transmitted as a response to the command ATR_REQ to the initiator when the target receives the command ATR_REQ. In the response ATR_RES, attributes, an NFCID, etc., of the target are located.

Transmission rate information as an attribute located in the command ATR_REQ and the response ATR_RES can include all the transmission rates of data which can be transmitted and received by the initiator and the target. In this case, by exchanging the command ATR_REQ and the response ATR_RES once between the initiator and the target, the initiator can recognize a transmission rate at which the target can perform transmission and reception, and the target can also recognize a transmission rate at which the initiator can perform transmission and reception.

A command WUP_REQ is transmitted when the initiator selects a target with which the initiator will communicate. Specifically, by transmitting a command DSL_REQ, which is described later, from the initiator to the target, the target can set to be in a deselected state (a state in which transmission (response) of data to the initiator is prohibited). The command WUP_REQ is transmitted in the case of releasing the deselected state and setting the target to be in a state capable of transmitting data to the initiator. In the command WUP_REQ, the NFCID of the target whose deselected state is to be released is located. Among targets having received the command WUP_REQ, a target which is identified by the NFCID located in the received command WUP_REQ releases its deselected state.

When, among the targets having received the command WUP_REQ, the target which is identified by the NFCID located in the received command WUP_REQ releases its deselected state, the response WUP_RES is transmitted as a response to the command WUP_REQ.

The command WUP_REQ is transmitted only when the initiator is in the active mode, and the response WUP_RES is transmitted only when the target is in the active mode.

A command PSL_REQ is transmitted when the initiator changes communication parameters concerning communication with the target. Here, the communication parameters include, for example, the transmission rate of data exchanged between the initiator and the target.

The command PSL_REQ includes the value of a changed communication parameter located therein, and is transmitted from the initiator to the target. The target receives the command PSL_REQ, and changes its communication parameter in accordance with the value of the communication parameter located in the command. The target further transmits a response PSL_RES to the command PSL_REQ.

A command DEP_REQ is transmitted when the initiator performs transmission and reception (data exchange with the target) of data (so-called real data). In this command, data to be transmitted to the target is located. The response DEP_RES is transmitted as a response to the command DEP_REQ. In this command, data to be transmitted to the initiator is located. Accordingly, the command DEP_REQ allows data to be transmitted from the initiator to the target, and the response DEP_RES to the command DEP_REQ allows data to be transmitted from the target to the initiator.

The command DSL_REQ is transmitted when the initiator sets the target to be in the deselected state. The target, which receives the command DSL_REQ, transmits the response DSL_RES to the command DSL_REQ and enters the deselected state, and subsequently becomes not responsive (comes to send back no response) to commands other than the command WUP_REQ.

A command RLS_REQ is transmitted when the initiator completely ends the communication with the target. The target, which has received the command RLS_REQ, transmits the response RLS_RES to the command RLS_REQ, and completely ends the communication with the initiator.

At this point, both the commands DSL_REQ and RLS_REQ are common in excluding a target from parties communicating with the initiator. However, the target excluded by the command DSL_REQ is set to be communicatable with the initiator again by the command WUP_REQ. However, the target excluded by the command RLS_REQ does not become communicatable with the initiator unless the initiator re-performs processing starting from the initial RFCA process. In that point, the commands DSL_REQ and RLS_REQ differ from each other.

Next, the communication of the NFC communication apparatus is performed in accordance with NFCIP-1 defined as ISO/IEC 18092.

Accordingly, a communication process in accordance with NFCIP-1 will be described with reference to FIGS. 9 to 11.

Figure 9:
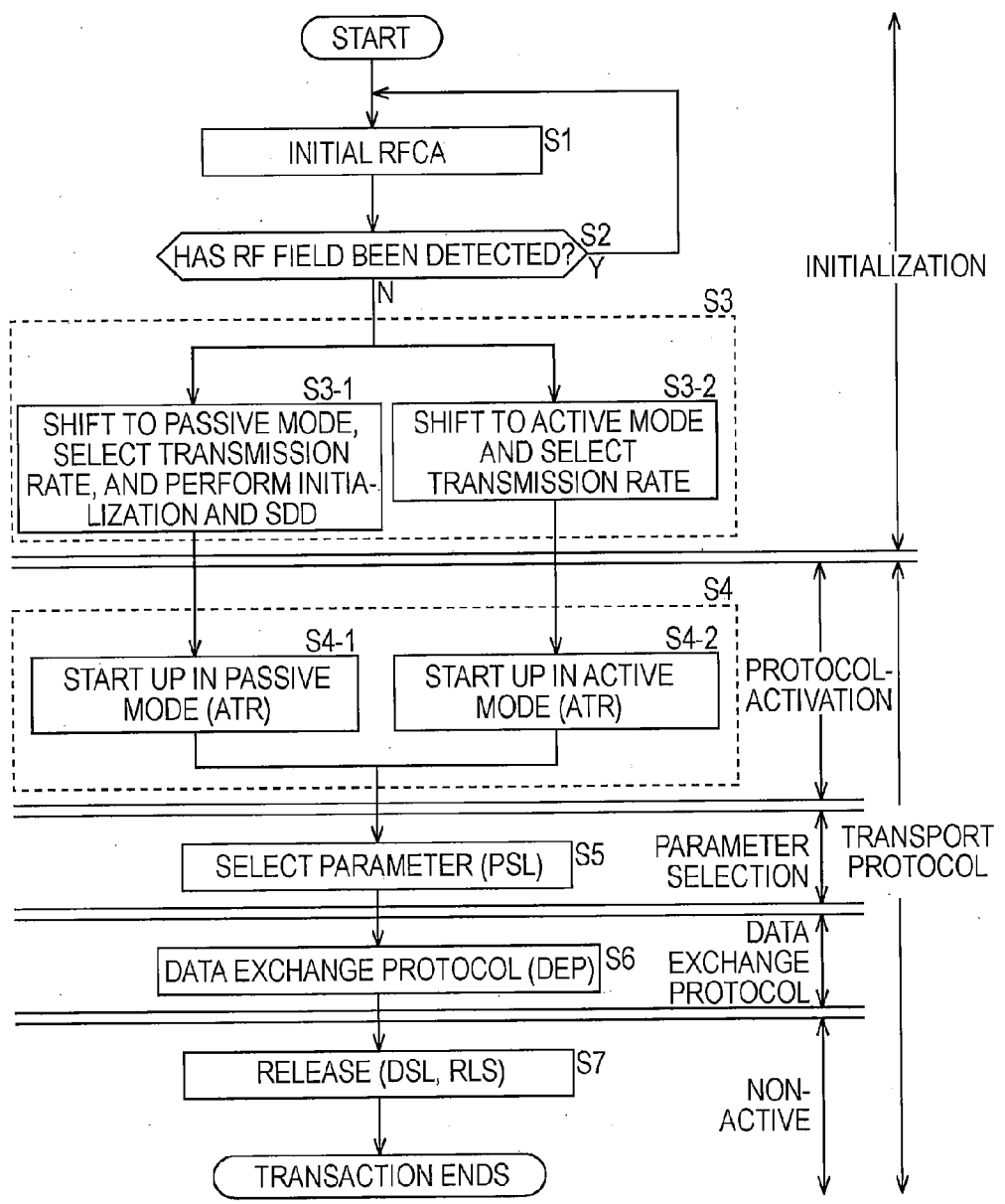
FIG. 9 is a flowchart illustrating typical initialization and SDD performed by an NFC communication apparatus.

FIG. 9 is a flowchart illustrating the outline of a communication process in accordance with NFCIP-1.

At first, in step S1, an NFC communication apparatus serving as an initiator performs an initial RFCA process and proceeds to step S2. In step S2, it is determined whether or not the NFC communication apparatus serving as an initiator has detected an RF field by the initial RFCA processing of step S1. When it is determined in step S2 that the RF field has been detected, the process returns to step S1, and subsequently identical processing is repeated. That is, the NFC communication apparatus serving as an initiator does not form an RF field so as not to impede communication by other NFC communication apparatuses that have formed the RF field while the RF field is being detected.

On the other hand, when it is determined in step S2 that the RF field has not been detected, the NFC communication apparatus selects one of the communication modes of the active mode and the passive mode. The process then proceeds to step S3, where the NFC communication apparatus functions as an initiator and selects, for example, a transmission rate.

That is, in the NFCIP-1, it is possible to select, for example, a transmission rate used for actual communication from among a plurality of transmission rate, such as 106 kbps, 212 kbps, and 424 kbps. Accordingly, in step S3, the NFC communication apparatus serving as an initiator selects a transmission rate.

More specifically, in the case of performing passive mode communication, the NFC communication apparatus proceeds from step S2 to step S3-1 between steps S3-1 and S3-2 forming step S3, becomes an initiator, changes the communication mode to the passive mode, and selects a transmission rate. Also, in step S3-1, the NFC communication apparatus, performs predetermined initialization and SDD processing, and proceeds to step S4-1 between steps S4-1 and S4-2 forming step S4.

In step S4-1, the NFC communication apparatus is activated (starts up) in the passive mode, exchanges the command ATR_REQ and the response ATR_RES with the target in the passive mode, and proceeds to step S5.

Alternatively, in the case of performing active mode communication, the NFC communication apparatus proceeds from step S2 to step S3-2 between steps S3-1 and S3-2 forming step S3, becomes an initiator, changes the communication mode to the active mode, selects the transmission rate, and proceeds to step S4-2 between steps S4-1 and S4-2 forming step S4.

In step S4-2, the NFC communication apparatus is activated in the active mode, exchanges the command ATR_REQ and the response ATR_RES with the target, and proceeds to step S5.

In step S5, when a communication parameter (for example, a transmission rate) required for communication needs to be changed from the current communication parameter, the NFC communication apparatus selects the communication parameter, exchanges the command PSL_REQ and the response PSL_RES in which the communication parameter and the like are located with the target, changes the communication parameter, and proceeds to step S6.

In step S6, the NFC communication apparatus exchanges the command DEP_REQ and the response DEP_RES with the target in accordance with the communication parameter selected in step S5, performs data exchange (communication) based on a data exchange protocol in accordance with the communication parameter selected in step S5, ends the data exchange, and then proceeds to step S7. In step S7, the NFC communication apparatus exchanges the command DSL- _REQ and the response DSL_RES, or the command RSL_REQ and the response RSL_RES with the target, is deactivated, and ends the transaction.

The NFC communication apparatus can be set by default to be, for example, a target. The NFC communication apparatus, which is set to be the target, forms no RF field, and is on standby until a command is transmitted from the initiator (until the initiator forms an RF field).

Also, the NFC communication apparatus can become an initiator, for example, in accordance with a request from an application. For example, an application can determine which one of the active mode and the passive mode the communication mode is, and can select (determine) the transmission rate.

The NFC communication apparatus, which becomes the initiator, forms an RF field if no RF field is formed in the exterior, and the target is activated by the RF field formed by the initiator.

After that, the initiator transmits a command in the selected communication mode and a transmission rate, and the target sends back (transmits) a response at a communication mode and a transmission rate identical to those of the initiator.

Next, a description will be given, with reference to the flowchart in FIG. 10, of processing of an activation protocol in a passive mode (processing performed by an NFC communication apparatus in order to perform data exchange in the passive mode).

At first, in step S11, the initiator performs an initial RFCA process, and the process then proceeds to step S12, where the communication mode is set to be a passive mode. Then, the process proceeds to step S13, where the initiator performs an initialization process and an SDD process, and selects a transmission rate.

At this point, the processing of step S11 corresponds to the processing of steps S1 and S2 of FIG. 9, and the processing of steps S12 and S13 corresponds to the processing of step S3 (S3-1) of FIG. 9.

Thereafter, the process proceeds to step S14, where the initiator determines whether or not a request for attributes should be made to the target. Here, the term attributes is information on the specification of the NFC communication apparatus, and examples thereof include information on the transmission rate that can be handled by the NFC communication apparatus.

When it is determined in step S14 that a request for attributes should not be made to the target, the process proceeds to step S15, where the initiator performs communication with the target in accordance with its unique protocol. Then, the process returns to step S14 and subsequently, similar processing is repeated.

When it is determined in step S14 that a request for attributes should be made to the target, the process proceeds to step S16, where the initiator transmits a command ATR_REQ, thereby making a request for attributes to the target. Then, the initiator waits for a response ATR_RES to the command ATR_REQ to be transmitted from the target, and the process proceeds to step S17, where the response ATR_RES is received. Then, the process proceeds to step S18.

At this point, the processing of steps S16 and S17 corresponds to the processing of step S4 (S4-1) of FIG. 9.

In step S18, on the basis of the response ATR_RES received from the target in step S17, the initiator determines whether or not the communication parameter, that is, for example, a transmission rate, can be changed. When it is determined in step S18 that the transmission rate cannot be changed, steps S19 to S21 are skipped, and the process proceeds to step S22.

When it is determined in step S18 that the transmission rate can be changed, the process proceeds to step S19, where the initiator transmits the command PSL_REQ, thereby requesting the target to change the transmission rate. Then, the initiator waits for a response PSL_RES to the command PSL_REQ to be transmitted from the target, and the process proceeds from step S19 to step S20, where the response PSL_RES is received. Then, the process proceeds to step S21. In step S21, the initiator changes the communication parameter, that is, for example, the transmission rate in accordance with the response PSL_RES received in step S20, and the process proceeds to step S22.

At this point, the processing of steps S18 to S21 corresponds to the processing of step S5 of FIG. 9.

In step S22, the initiator performs data exchange, that is, exchange of the command DEP_REQ and the response DEP_RES, with the target in accordance with a data exchange protocol.

At this point, the processing of step S22 corresponds to the processing of step S6 of FIG. 9.

After data conversion has been performed in step S22, the initiator proceeds to step S23 or S25 as necessary.

That is, when the initiator sets the target to be in a deselected state, the process proceeds from step S22 to step S23, and the initiator transmits a command DSL_REQ. Then, the initiator waits for a response DSL_RES to the command DSL_REQ to be transmitted from the target and proceeds from step S23 to step S24, where the response DSL_RES is received. The process then returns to step S14 and subsequently, similar processing is repeated.

On the other hand, when the initiator completely ends the communication with the target, the process proceeds from step S22 to step S25, where the command RLS_REQ is transmitted. Then, the initiator waits for the response RLS_RES to the command RLS_REQ to be transmitted from the target, and the process then proceeds from step S25 to step S26, where the response RLS_RES is received. Then, the process returns to step S11 and subsequently, similar processing is repeated.

At this point, the processing of steps S23 and S24 and the processing of steps S25 and S26 correspond to the processing of step S7 of FIG. 9.

Next, a description will be given, with reference to the flowchart in FIG. 11, of an activation protocol in the active mode.

At first, in step S31, the initiator performs an initial RFCA process, and the process then proceeds to step S32, where the initiator sets the communication mode to an active mode and selects the transmission rate.

Here, the processing of step S31 corresponds to the processing of steps S1 and S2 of FIG. 9, and the processing of step S32 corresponds to the processing of step S3 (S3-2).

Figure 10:
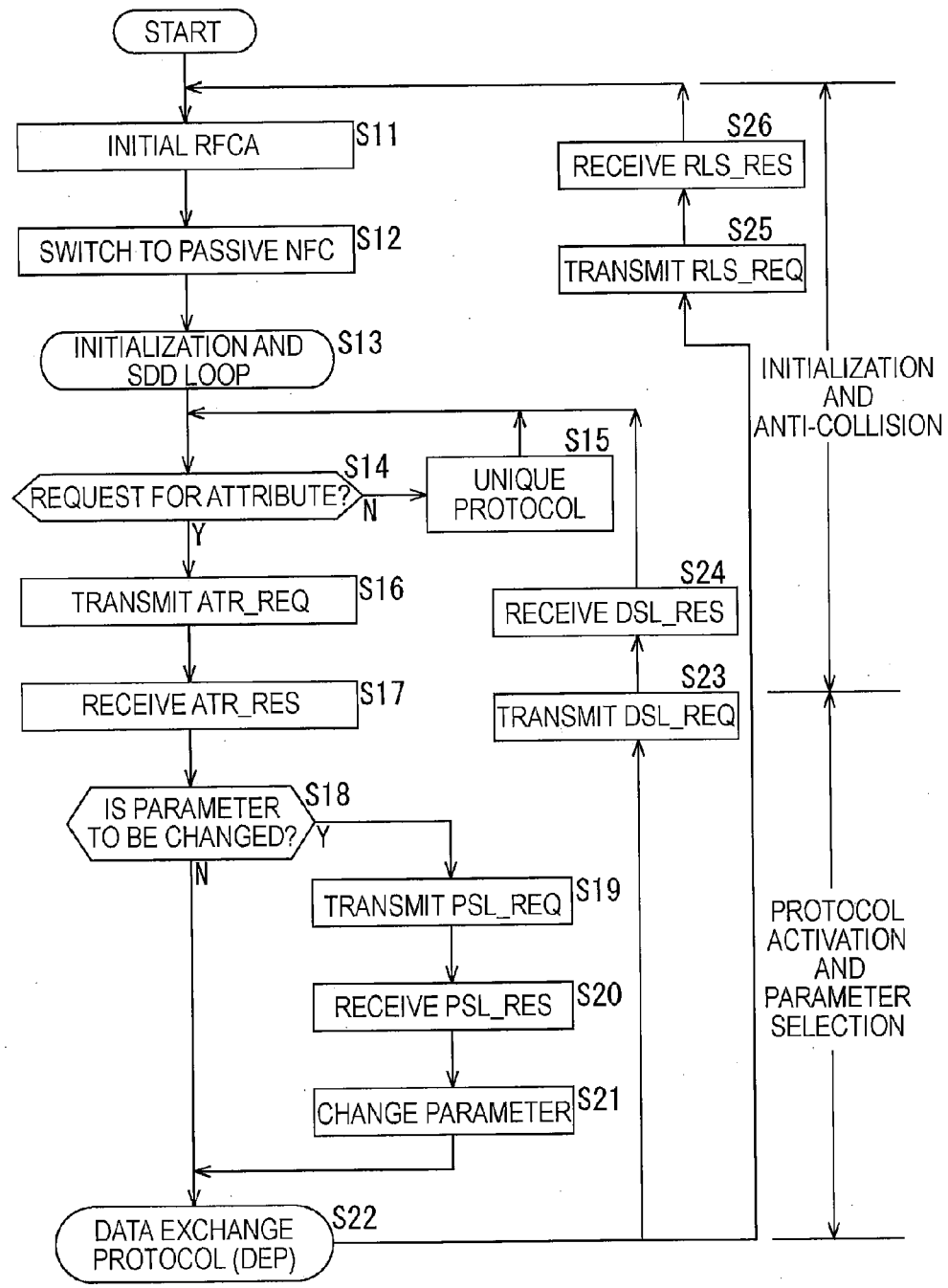
FIG. 10 is a flowchart illustrating an activation protocol in a passive mode.

Thereafter, in steps S33 to S39, processes similar to those in steps S16 to S22 of FIG. 10 is performed, respectively.

That is, in step S33, the initiator transmits a command ATR_REQ, thereby making a request for attributes to the target. Then, the initiator waits for a response ATR_RES to the command ATR_REQ to be transmitted from the target, and the process proceeds to step S34, where the response ATR_RES is received. The process then proceeds to step S35.

In step S35, on the basis of the response ATR_RES received from the target in step S34, the initiator determines whether or not the communication parameter, that is, for example, the transmission rate, can be changed. When it is determined in step S35 that the transmission rate cannot be changed, the initiator skips steps S36 to S38 and proceeds to step S39.

When it is determined in step S35 that the transmission rate cannot be changed, the process proceeds to step S36, where the initiator transmits the command PSL_REQ, thereby requesting the target to change the transmission rate. Then, the initiator waits for the response PSL_RES to the command PSL_REQ to be transmitted from the target, and the process proceeds from step S36 to S37, where the response PSL_RES is received. The process then proceeds to step S38. In step S38, the initiator changes the communication parameter, that is, for example, the transmission rate, in accordance with the response PSL_RES received in step S37, and the process then proceeds to step S39.

In step S39, the initiator performs data exchange, that is, exchange of the command DEP_REQ and the response DEP_RES, with the target in accordance with a data exchange protocol.

At this point, the processing of steps S33 and S34 corresponds to the processing of step S4 (S4-2) of FIG. 9, and the processing of steps S35 to S38 corresponds to the processing of step S5 of FIG. 9. The processing of step S39 corresponds to the processing of step S6 of FIG. 9.

After the data conversion in step S39, the process proceeds to step S40 or S44 as necessary.

That is, when the initiator sets the target with which communication is being performed to a deselected state and causes one of the targets that have already been set in a deselected state to wake up, the process proceeds from step S39 to step S40, where the command DSL_REQ is transmitted to the target to be set in a deselected state. Then, the initiator waits for the response DSL_RES to the command DSL_REQ to be transmitted from the target, and the process proceeds from step S40 to step S41, where the response DSL_RES is received. Here, the target having transmitted the response DSL_RES enters a deselected state.

Thereafter, the process proceeds from step S41 to step S42, where the initiator transmits a command WUP_REQ to the target to be waked up. Then, the initiator waits for a response WUP_RES to the command WUP_REQ to be transmitted from the target, and the process proceeds from step S42 to step S43, where the response WUP_RES is received. The process then returns to step S35. Here, the target having transmitted the response WUP_RES wakes up, and the waked-up target becomes an object for which the processing of step S35 and subsequent steps should be performed thereafter by the initiator.

On the other hand, when the initiator completely ends communication with the target, the process proceeds from step S39 to step S44, where the command RLS_REQ is transmitted. Then, the initiator waits for a response RLS_RES to the command RLS_REQ to be transmitted from the target, and the process proceeds from step S44 to S45, where the response RLS_RES is received. The process then returns to step S31 and subsequently, similar processing is repeated.

At this point, the processing of steps S40 to 43 and the processing of steps S44 and S45 correspond to the processing of step S7 of FIG. 9.

In the foregoing, the communication process in compliance with NFCIP-1 has been described with reference to FIGS. 9 to 11.

If the NFC communication apparatus simply performs a communication process in compliance with NFCIP-1, the above-described problem that inherently possessed capabilities cannot be fully exhibited occurs.

Accordingly, the inventors of the present invention further invented a method in which one predetermined NFC communication apparatus generates, for each type of the capabilities, a group of data containing one or more pieces of information related to one predetermined type of capability possessed by the NFC communication apparatus or its communication party, and transmits it, with the one or more groups of data being stored in a predetermined command or a predetermined response, to the NFC communication apparatus of the communication party.

In the following, a structure (data group) that is configured in such a manner that one or more fields in which information related to a predetermined type of capability is described are located in predetermined order will be referred to as a capsule. "Predetermined information is described" in one predetermined field among one or more fields constituting a predetermined structure, including a capsule, will be referred to as "predetermined information is set". More specifically, in this method of the present invention, regarding each of n+1 types (n is an integer of 0 or more) of capabilities possessed by at least one of the NFC communication apparatuses on the transmission side and on the receiving side (the communication party side when viewed from the transmission side), the NFC communication apparatus on the transmission side sets various kinds of information related to the corresponding type of capability in one predetermined field among one or more fields. Thus, a capsule for the corresponding type of capabilities is generated for each of the n+1 types, and the n+1 capsules, with the n+1 capsules being stored in predetermined commands and predetermined responses, are transmitted to the NFC communication apparatus on the receiving side.

This capsule can also be structured to contain, for example, a field in which information indicating a predetermined type of capability is set, a field in which "information instructing the activation of capabilities to the communication party side" for the predetermined type of capability is set, and a field in which "information notifying the fact that the apparatus has confirmed the activation of capabilities to the communication party side" for the predetermined type of capability is set.

Figure 12:
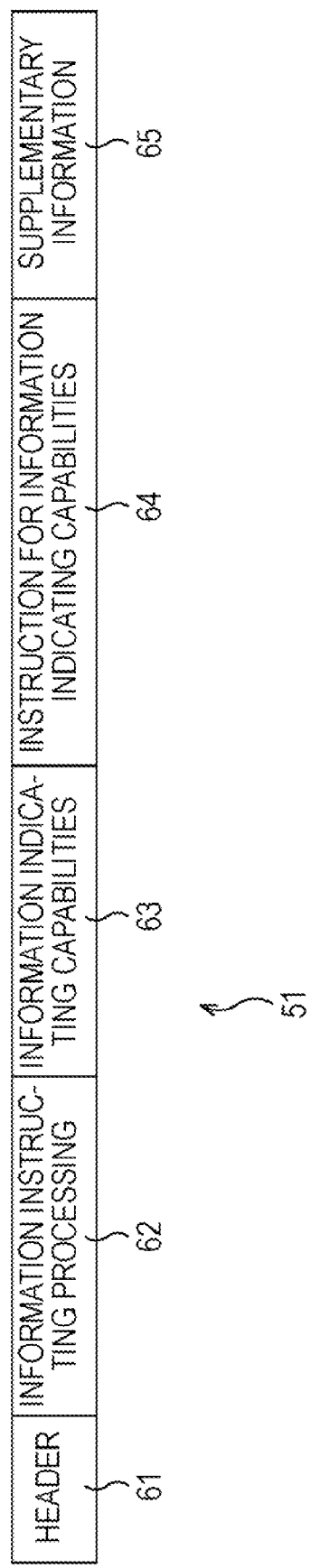
FIG. 12 illustrates an example of the configuration of a capsule to which the present invention is applied.

More specifically, for example, the NFC communication apparatus can use a capsule 51 of the structure shown in FIG. 12. That is, FIG. 12 shows an example of the structure of a capsule to which the present invention is applied.

The capsule 51 of FIG. 12 is composed of fields 61 to 65.

In the field 61, as shown in FIG. 12, so-called header information is written. Accordingly, the field 61 will be hereinafter referred to simply as a header 61.

In the field 62, as shown in FIG. 12, information used by the NFC communication apparatus on the transmission side to instruct a predetermined process to the NFC communication apparatus on the receiving side (the communication party side when viewed from the transmission side) is set. Accordingly, the field 62 will be hereinafter referred to as an "information instructing processing" field 62. That is, as will be described later, in the "information instructing processing" field 62, one of the pieces of the "information instructing the activation of capabilities to the communication party side" may be set. A specific example of the information that is set in the "information instructing processing" field 62 will be described later.

In the field 63, as shown in FIG. 12, information indicating a predetermined type of capability among capabilities possessed by the NFC communication apparatus on the transmission side is set. Accordingly, the field 63 will be hereinafter referred to as an "information indicating capabilities" field

63. A specific example of the information that is set in the "information indicating capabilities" field 63 will be described later.

In the field 64, as shown in FIG. 12, information used by the NFC communication apparatus on the transmission side to perform instructions for the information set in the "information indicating capabilities" field 63 to the left of the field 64, that is, predetermined instructions for a predetermined type of capability, on the NFC communication apparatuses on the receiving side (the communication party side when viewed from the transmission side), is set. Accordingly, the field 64 will be hereinafter referred to as "instructions for information indicating capabilities" field 64. That is, in the "instructions for information indicating capabilities" field 64, one of the pieces of the "information instructing the activation of capabilities to the communication party side" may be set. A specific example of the information that is set in the "instructions for information indicating capabilities" field 64 will be described later.

In the field 65, as shown in FIG. 12, other supplementary information is set. Accordingly, the field 65 will be hereinafter referred to as a "supplementary information" field 65. For example, it is possible for the NFC communication apparatus on the transmission side to set "information notifying the fact that the NFC communication apparatus has confirmed the activation of capabilities to the communication party side" as supplementary information in the "supplementary information" field 65. A specific example of the information that is set in the "supplementary information" field 65 will be described later.

As a result of employing such a capsule 51, while faithfully using the NFCIP-1 standard as it is between the NFC communication apparatus and the NFC communication apparatus on the communication party side (while performing the above-described communication process in compliance with NFCIP-1), it is possible to exchange information regarding the presence of capability greater than a group of capabilities defined by NFCIP-1, that is, the capability of a type differing from the type defined by NFCIP-1, or the capability of a type such that the capability level possessed by the NFC communication apparatus or the NFC communication apparatus on the communication party side is higher than the level defined by NFCIP-1 even if the type is a type defined by NFCIP-1, and possible to instruct and confirm the activation of the capability. This is because information on the capability greater than a group of capabilities defined by NFCIP-1, that is, the capability of a type differing from the type defined by NFCIP-1, or the capability of a type such that the capability level possessed by the NFC communication apparatus is higher than the level defined by NFCIP-1 even if the type is a type defined by NFCIP-1, can be easily contained in the capsule 51.

Even if another NFC communication apparatus that does not employ such a capsule 51 becomes a communication party, it is possible for the NFC communication apparatus to perform the above-described communication process in accordance with NFCIP-1 as it is with the NFC communication apparatus on the communication party side.

The location where such a capsule 51 is stored may be set to any command or any response in the manner described above. However, in this embodiment, the location is set as a command ATR_REQ or a response ATR_RES. The reason for this is that, as described above, the command ATR_REQ and the response ATR_RES are used when notifying a communication party of attributes (specification) of its own or making a request for the attributes of the communication party. That is, it stands to reason that the capsule 51 used when notifying a communication party of attributes (specification) of its own or making a request for the attributes of the communication party is stored in the command ATR_REQ and the response ATR_RES. Another reason is that, in the NFCIP-1, a field called general byte (hereinafter referred to as a "field Gi") is defined in the command ATR_REQ and the response ATR_RES, and the capsule 51 can be easily stored in the field Gi.

Referring to FIGS. 13 to 19, the command ATR_REQ and the response ATR_RES will be described below in more detail.

For the sake of convenience, a description will be given below by assuming that the initiator transmits a command ATR_REQ and the target transmits a response ATR_RES. However, naturally, in practice, there can be a case reverse to that, that is, the target transmits the command ATR_REQ and the initiator transmits the response ATR_RES.

FIG. 13 shows the structure of the command ATR_REQ defined by NFCIP-1.

As shown in FIG. 13, the command ATR_REQ is composed of, starting from the beginning (from the left in the figure), a field CMD0, a field CMD1, and fields Byte 0 to Byte n+14 (n is an integer of 0 or more).

In the field CMD0, (D4) is set. In the field CMD1, a value (00) indicating that this command is a command ATR_REQ is set.

In the fields Bytes 0 to 9, the above-described NFCID that specifies the NFC communication apparatus that transmits this command ATR_REQ, that is, the initiator, is set.

In the field Byte 10, DIDi, which is a device ID of the initiator that transmits the command ATR_REQ, is set. Accordingly, the field Byte 10 will also be hereinafter referred to as a field DIDi.

In the field Byte 11, a bit rate (transmission rate) at which the initiator for transmitting the command ATR_REQ transmits data is set. The field Byte 11 will also be hereinafter referred to as a field BSi. The details of the field BSi will be described later with reference to FIGS. 14 and 15.

In the field Byte 12, a bit rate (transmission rate) at which the initiator for transmitting the command ATR_REQ receives data is set. The field Byte 11 will also be hereinafter referred to as a field BRi. The details of the field BRi, together with the details of the field BSi, will be described later.

As described above, each of the transmission rate set in the field BSi and the transmission rate set in the field BRi becomes one of the attributes (specification) of the initiator for transmitting the command ATR_REQ in the manner described above.

In the field Byte 13, an option parameter for the initiator for transmitting the command ATR_REQ is set. The field Byte 13 will also be hereinafter referred to as a field PPi. The details of the field PPi will be described later with reference to FIGS. 16 to 18.

Each of the fields Byte 14 to Byte 14+n is each of the above-described fields called general byte, that is, the field Gi. That is, each of the n+1 fields Gi is located as each of the fields Byte 14 to 14+n in the command ATR_REQ. The n fields Gi will be hereinafter referred to as fields Gi to Gi[n] in the order of the arrangement thereof (in sequence from the left in FIG. 13), correspondingly.

Each of the fields Gi[0] to Gi[n] is a field in which various kinds of information specified by a designer or the like is set, and is a field provided as an option. That is, the value n can be changed by a designer or the like, and becomes an integer of 0 or more in the manner described above. The value n is set in the field PPi as will be described later.

In this embodiment, as described above, the capsule 51 of FIG. 12 is stored in each of the fields Gi[0] to Gi[n].

The field BSi within the command ATR_REQ will be described below with reference to FIGS. 14 and 15, and then the field BRi will be described. Next, the field PPi will be described below with reference to FIGS. 16 to 18.

FIG. 14 shows the structure of the field BSi defined by NFCIP-1.

As shown in FIG. 14, the field BSi is composed of 1-byte information, that is, 8-bit information.

In the following, information of each bit will be referred to as bits 0 to 7, correspondingly, from the lowest-order bit (the rightmost bit in FIG. 14) toward the higher-order bits (to the left in FIG. 14). This applies the same for the other fields composed of 1-byte information, that is, for the fields BRi, PPi, Gi, and the like.

In bits 4 to 7 within the field BSi, 0 (ZERO) is set. In each of bits 0 to 3, information (0 or 1) indicating whether or not the initiator for transmitting the command ATR_REQ can perform processing at each of the transmission rates of 847 kbps, 1695 kbps, 3390 kbps, and 6780 kbps is set. That is, for example, if 0 is assumed to indicate that processing is not possible and 1 is assumed to indicate that processing is possible, the fact that 0 has been set in bit 0 means that the initiator for transmitting the command ATR_REQ cannot perform processing at the transmission rate of 847 kbps. In comparison, the fact that 1 has been set in bit 0 means that the initiator for transmitting the command ATR_REQ can perform processing at the transmission rate of 847 kbps.

The fact that, for the NFC communication apparatus, processing at a transmission rate of each of 106 kbps, 212 kbps, and 424 kbps is necessary and needs to be capable of being performed, is defined by NFCIP-1.

In other words, in NFCIP-1, as shown in FIG. 15, as values that can be taken as transmission rates when data is transmitted and received, 106, 212, 424, 847, 1695, 3390, and 6780 kbps are defined. The table of FIG. 15 shows transmission rates defined by NFCIP-1.

In the table of FIG. 15, in the leftmost item of "Communication Mode", a communication mode in which communication is possible at the transmission rate described in the item of "kbps" to the right thereof is described. That is, the fact that, at the transmission rates of 106, 212, and 424 kbps, communication is possible at any communication mode of the active mode and the passive mode (the NFC communication apparatus needs only to be configured in such a manner) is defined by NFCIP-1. In comparison, the fact that, at 847, 1695, 3390, and 6780 kbps, communication needs only possible in the active mode (the NFC communication apparatus needs only to be configured in such a manner) is defined by NFCIP-1.

In the values of FIG. 15, in the center item of "kbps", transmission rates defined by NFCIP-1 are described.

In the values of FIG. 15, in the rightmost item of "Divisor D", values of a parameter D used in the following equation (1) when the transmission rate described in the item of "kbps" to the left thereof are used are described.

$$1bd = 128/(D \times f_c) \quad (1)$$

In equation (1), bd indicates the duration time of the bits and $f_c$ indicates the frequency of the carrier wave.

In the foregoing, the structure of the field BSi within the command ATR_REQ of FIG. 13 has been described.

The structure of the field BRi is basically identical to the structure of the above-described field BSi, and accordingly, a description thereof is omitted.

In other words, for example, even if the initiator for transmitting the command ATR_REQ or the target for receiving the command ATR_REQ can perform processing at a transmission rate higher than 6780 kbps, such a high transmission rate is not defined by NFCIP-1, and it cannot be set in the field BRi and the field BSi. Therefore, in such a case, the initiator may contain information on such a high transmission rate in the capsule 51 of FIG. 12 and further may store the capsule 51 in the field Gi[k] of FIG. 13 within the command ATR_REQ (k is one of the values of 0 to n). As a result, transmission/reception at such a high transmission rate is made possible.

Next, a description will be given of the field PPi within the command ATR_REQ with reference to FIGS. 16 to 18.

FIG. 16 shows the structure of the field PPi defined by NFCIP-1.

As shown in FIG. 16, the field PPi is composed of bits 0 to 7.

In bits 7, 6, 3, and 2, 0 (ZERO) is set.

In bits 4 and 5, information LRi for specifying the effective data length of transport data is set.

As this information LRi, as shown in FIG. 17, one of "00", "01", "10", and "11" is used. That is, FIG. 17 is a table showing each value that can be taken by the information LRi, and the range $LEN_{MAX}$ of the effective data length of the transport data, indicated by each value.

The transport data refers to data of a transport data field shown in FIG. 18, that is, fields CMD0 to Byte N (N is an integer of 0 or more and is n+14 in the case of examples of FIGS. 13 and 19 (to be described later)). That is, FIG. 18 shows the structure of one frame containing transport data (for example, in this embodiment, predetermined one of commands and responses shown in FIG. 8 described above). In more detail, the upper side in FIG. 18 shows the structure of one frame when the transmission rate is 106 kps, and the lower side shows the structure of one frame when the transmission rate is 212 kps or 424 kbps.

Figure 18:
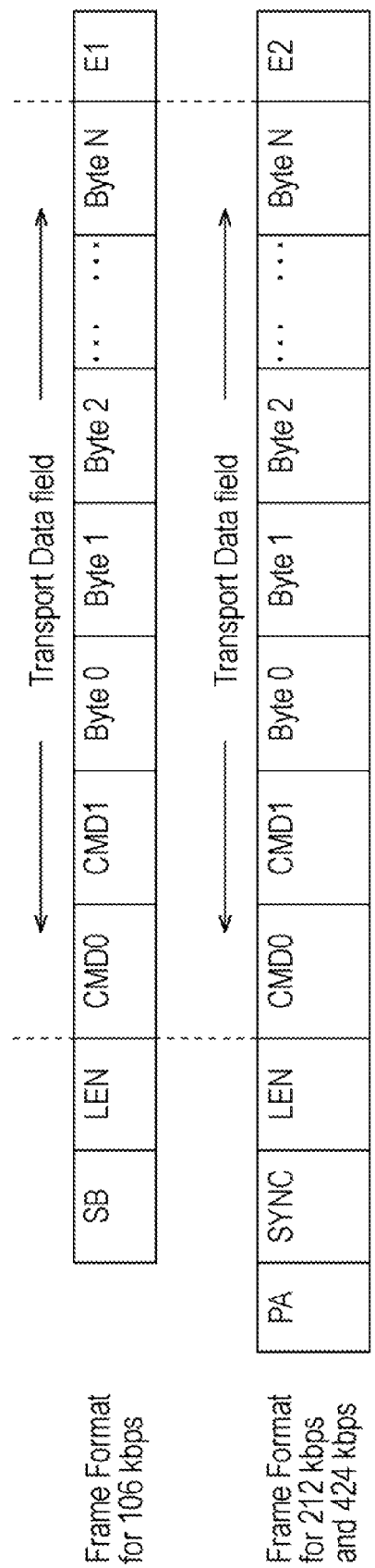
FIG. 18 is another illustration of information LRi that can be set in bit 4 of the field PPi of the command ATR_REQ.

In FIG. 18, in the field denoted as SB, a value indicating the first field of the frame is set. In the field described as LEN, a value such that 1 is added to the effective data length of the transport data (transport data field) following the field LEN is set. In the field described as PA, information indicating a preamble is set. In the field described as SYNC, information indicating a synchronous pattern (synchronous pattern bit) is set. In the fields described as E1 and E2, a value indicating the end field of the frame is set.

As shown in FIGS. 17 and 18, when the transport data field extends up to the field Byte 63, that is, when the effective data length of the transport data is 66 bytes, the information LRi becomes "00". That is, in this case, "00" is set in bits 4 and 5 of the field PPi of FIG. 16.

When the transport data field extends up to the field Byte 127, that is, when the effective data length of the transport data extends up to 130 bytes, the information LRi becomes "01". That is, in this case, "01" is set in bits 4 and 5 of the field PPi of FIG. 16.

When the transport data field extends up to the field Byte 191, that is, when the effective data length of the transport data extends up to 194 bytes, the information LRi becomes "10". That is, in this case, "10" is set in bits 4 and 5 of the field PPi of FIG. 16.

When the transport data field extends up to the field Byte 255, that is, when the effective data length of the transport data extends up to 258 bytes, the information LRi becomes "11". That is, in this case, "11" is set in bits 4 and 5 of the field PPi of FIG. 16.

In bit 1 of the field PPi of FIG. 16, following the field PPi, information Gi indicating whether or not the above-described fields Gi[0] to Gi[n] have been located (exist or not) is set. That is, since the information Gi is 0 or 1, for example, 0 is assumed to indicate that the fields Gi[0] to Gi[n] have not been located (does not exist) and 1 is assumed to indicate that the fields Gi[0] to Gi[n] have been located (exist). In this case, the fact that 0 has been set in bit 1 means that, following the field PPi, the fields Gi[0] to Gi[n] have not been located, that is, in this embodiment, no capsule 51 of FIG. 12 has been stored. In comparison, the fact that 1 has been set in bit 1 means that, following the field PPi, the fields Gi[0] to Gi[n] have been located, that is, at least one capsule 51 has been stored in this embodiment.

In bit 0 of the field PPi, information (0 or 1) indicating whether or not NAD (Node Address) is used is set. The NAD refers to a sub-address of the device ID of the initiator for transmitting the command ATR_REQ, which is set in the field Byte 10 of FIG. 13 described above, that is, the field DIDi of FIG. 13. The fact that it is possible to have 16 sub-addresses with respect to one device ID is defined by NFCIP-1.

When it is assumed that, for example, 0 in bit 0 indicates that a sub-address is not used and 1 indicates that a sub-address is used, the fact that 0 has been set in bit 0 means that the initiator for transmitting the command ATR_REQ does not use a sub-address. In comparison, the fact that 1 has been set in bit 0 means that the initiator for transmitting the command ATR_REQ uses a sub-address.

In the foregoing, the detailed structure of the command ATR_REQ has been described with reference to FIGS. 13 to 18.

The structure of a response to the command ATR_REQ having such a structure, that is, a response ATR_RES, is shown in FIG. 19. When FIG. 13 is compared with FIG. 19, it can be seen that the structure of the response ATR_RES has the same structure as that of the command ATR_REQ. Accordingly, a description of the structure of the response ATR_RES is omitted.

As has been described in the foregoing, in NFCIP-1, the field Gi is defined in the command ATR_REQ and the response ATR_RES. Thus, in this embodiment, the capsule 51 of FIG. 12 described above is stored in the field Gi of the command ATR_REQ and the response ATR_RES and is transmitted and received among a plurality of NFC communication apparatuses.

More specifically, for example, in this embodiment, the initiator transmits the command ATR_REQ to the target in the processing of step S16 of FIG. 10 described above or in the processing of step S33 of FIG. 11 described above. In this case, when the initiator transmits the command ATR_REQ, with at least one capsule 51 being contained in the command ATR_REQ, to the target, as the processing of step S16 of FIG. 10 described above or as the processing of step S33 of FIG. 11 described above, for example, an "ATR_REQ transmission process on the initiator side" shown in FIG. 20 can be performed. That is, FIG. 20 is a flowchart illustrating an example of the "ATR_REQ transmission process on the initiator side" when the initiator transmits the command ATR_REQ containing at least one capsule 51.

Figure 20:
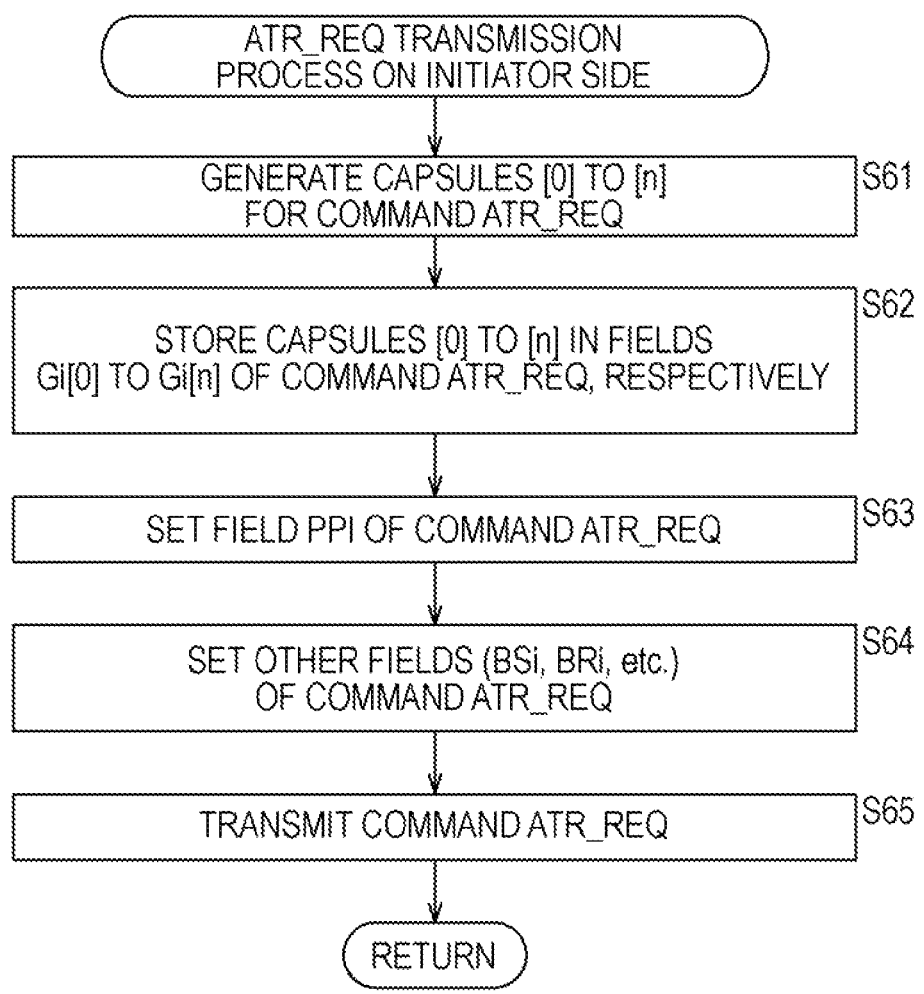
FIG. 20 is a flowchart illustrating an ATR_REQ transmission process on an initiator side.
Figure 21:
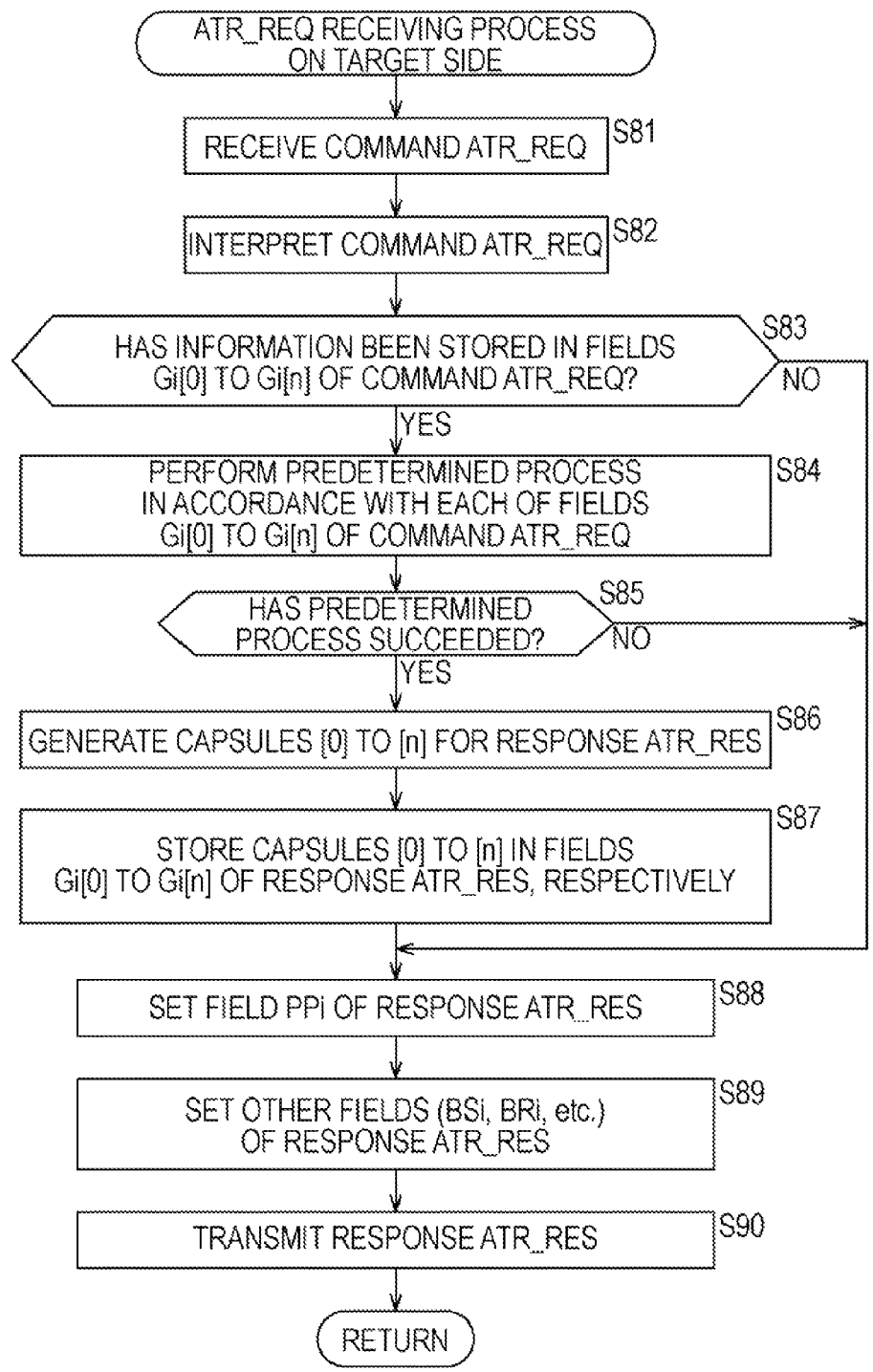
FIG. 21 is a flowchart illustrating an ATR_REQ receiving process on a target side.

An example of processing on the target side (hereinafter referred to as an "ATR_REQ receiving process on the target side" for such "ATR_REQ transmission process on the initiator side" of FIG. 20 is shown in FIG. 21. That is, FIG. 21 is a flowchart illustrating an example of the "ATR_REQ receiving process on the target side" when the target receives the command ATR_REQ having a possibility of containing the capsule 51.

As will be described later, as a result of the "ATR_REQ receiving process on the target side" of FIG. 21, the response ATR_RES is transmitted from the target to the initiator. Therefore, in this embodiment, the initiator receives the response ATR_RES in the processing of step S17 of FIG. 10 described above or in the processing of step S34 of FIG. 11 described above. In this case, as the processing of step S17 of FIG. 10 or as the processing of step S34 of FIG. 11, for example, an "ATR_RES receiving process on the initiator side" shown in FIG. 22 can be performed. That is, FIG. 22 is a flowchart illustrating an example of the "ATR_RES receiving process on the initiator side" when the initiator receives a response ATR_RES to the command ATR_REQ containing at least one capsule 51.

Figure 22:
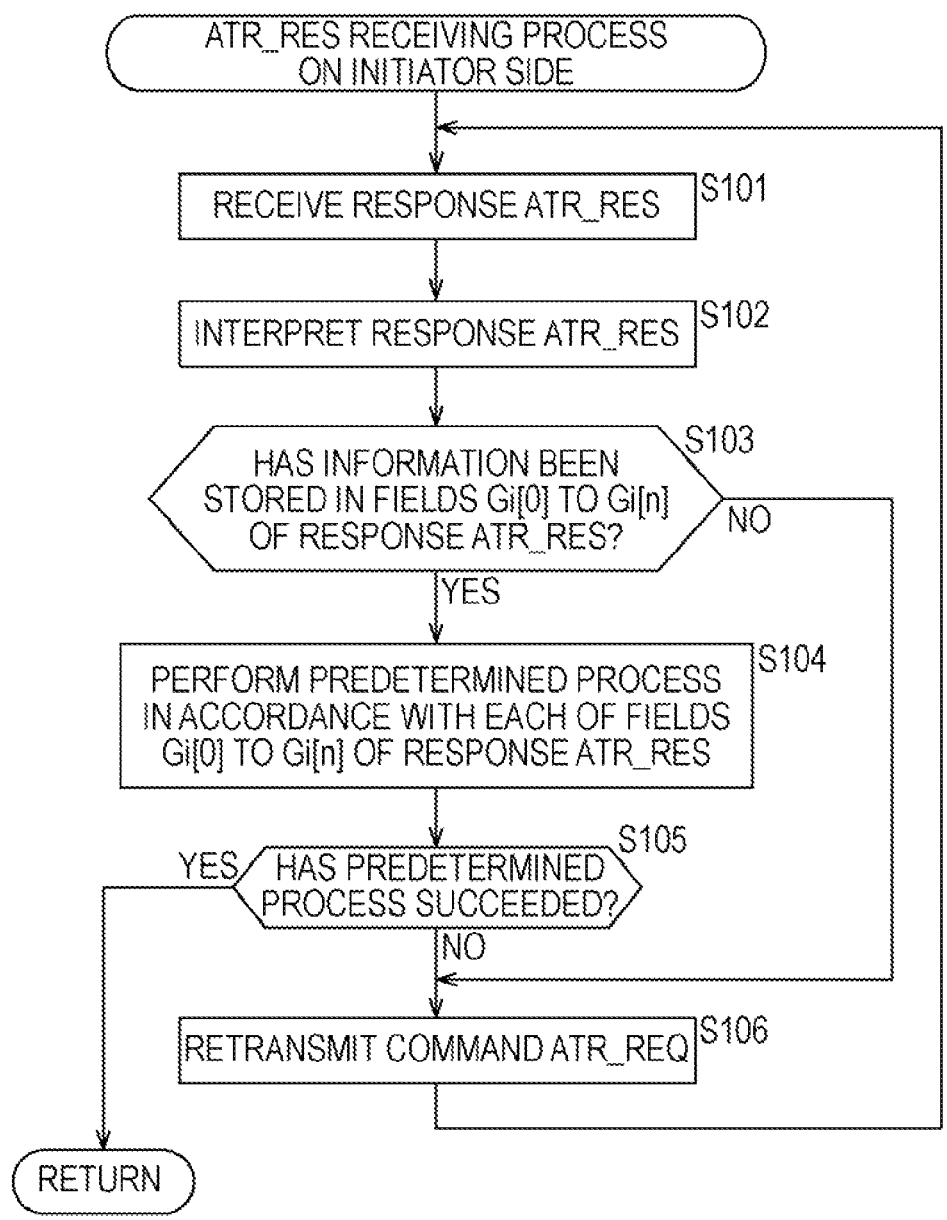
FIG. 22 is a flowchart illustrating an ATR_RES receiving process on the initiator side.

At this point, as described above, since it is assumed for the sake of convenience that the initiator transmits a command ATR_REQ, the "ATR_REQ transmission process on the initiator side" of FIG. 20 is performed by the initiator, the "ATR_REQ receiving process on the target side" of FIG. 21 is performed by the target, and the "ATR_RES receiving process on the initiator side" of FIG. 22 is performed by the initiator. However, as described above, there is a case in which the target transmits the command ATR_REQ. In such a case, the "ATR_REQ transmission process on the initiator side" of FIG. 20 is performed by the target, the "ATR_REQ receiving process on the target side" of FIG. 21 is performed by the initiator, and the "ATR_RES receiving process on the initiator side" of FIG. 22 is performed by the target.

A description will be individually given below of the "ATR_REQ transmission process on the initiator side" of FIG. 20, the "ATR_REQ receiving process on the target side" of FIG. 21, and the "ATR_RES receiving process on the initiator side" of FIG. 22 in this order.

In the following description, n+1 capsules 51 are generated or used. One of the n+1 capsules 51 that is stored in the field Gi[k] of the request ATR_REQ or the response ATR_RES (k is one of the values of 0 to n) will be referred to as a capsule [k].

A description will be given first, with reference to the flowchart in FIG. 20, of an example of the "ATR_REQ transmission process on the initiator side".

In step S61, the initiator generates each of capsules [0] to [n] for the command ATR_REQ. A specific example of the capsules [0] to [n] for the command ATR_REQ will be described later.

In step S62, the initiator stores the capsules [0] to [n] in the fields Gi[0] to Gi[n] of the command ATR_REQ, respectively.

In step S63, the initiator sets the field PPi of the command ATR_REQ.

In step S64, the initiator sets the other fields (the field BSi, the field BRi, and the like) of the command ATR_REQ.

In step S65, the initiator transmits the command ATR_REQ to the target.

This completes the "ATR_REQ transmission process on the initiator side".

In the manner described above, when the command ATR_REQ is transmitted from the initiator to the target, for example, the target performs the process of the "ATR_REQ receiving process on the target side" of FIG. 21. Accordingly, a description will be given below, with reference to the flowchart in FIG. 21, of an example of the "ATR_REQ receiving process on the target side".

In step S81, the target receives the command ATR_REQ.
In step S82, the target interprets the command ATR_REQ.
In step S83, on the basis of the interpretation result of the command ATR_REQ, the target determines whether or not information has been stored in the fields Gi[0] to Gi[n] of the command ATR_REQ.

When it is determined in step S83 that no information has been stored in the fields Gi[0] to Gi[n] of the command ATR_REQ, the process proceeds to step S88. That is, the processing of steps S84 to S87 (to be described later) is not performed. The processes of step S88 and subsequent steps will be described later.

On the other hand, as a result of the "ATR_REQ transmission process on the initiator side" of FIG. 20, when the command ATR_REQ transmitted from the initiator is received in the processing of step S81 and the command ATR_REQ is correctly interpreted in the processing of step S82, the capsules [0] to [n] are stored in the fields Gi[0] to Gi[n] of the command ATR_REQ, respectively. Therefore, in such a case, when it is determined in step S83 that the information has been stored in the fields Gi[0] to Gi[n] of the command ATR_REQ, the process proceeds to step S84.

In step S84, the target performs a predetermined process in accordance with each of the fields Gi[0] to Gi[n] of the command ATR_REQ, that is, a predetermined process in accordance with each content of the capsules [0] to [k] stored in the fields Gi[0] to Gi[n], respectively. A specific example of the predetermined process performed in step S84 will be described later.

In step S85, the target determines whether or not the predetermined process in step S84 has succeeded.

When it is determined in step S85 that the predetermined process in step S84 has failed (has not succeeded), the process proceeds to step S88. That is, the processing of steps S86 and S87 (to be described later) is not performed. The processes of step S88 and subsequent steps will be described later.

On the other hand, when it is determined in step S85 that the predetermined process in step S84 has succeeded, the process proceeds to step S86. In step S86, the target generates capsules [0] to [n] for the response ATR_RES. A specific example of the capsules [0] to [n] for the response ATR_RES will be described later.

In step S87, the target stores the capsules [0] to [n] in the fields Gi[0] to Gi[n] of the response ATR_RES, respectively. Then, the process proceeds to step S88.

As has been described in the foregoing, when the processing of step S87 is completed, in the case that the determination in step S83 is NO or in the case that the determination in step S85 is NO, the process proceeds to step S88. In step S88, the target performs the setting of the field PPi of the response ATR_RES.

In step S89, the target performs the setting of the other fields (the field BSi, the field BRi, and the like) of the response ATR_RES.

In step S90, the target transmits a response ATR_RES to the initiator.

This completes the "ATR_REQ receiving process on the target side".

When the response ATR_RES is transmitted from the target to the initiator in the manner described above, the initiator performs, for example, the process of the "ATR_RES receiving process on the initiator side" of FIG. 22. Accordingly, a description will be given below, with reference to the flowchart in FIG. 22, of an example of the "ATR_RES receiving process on the initiator side".

In step S101, the initiator receives the response ATR_RES.
In step S102, the initiator interprets the response ATR_RES.
In step S103, on the basis of the interpretation result of the response ATR_RES, the initiator determines whether or not information has been stored in the fields Gi[0] to Gi[n] of the response ATR_RES.

When it is determined in step S103 that no information has been stored in the fields Gi[0] to Gi[n] of the response ATR_RES, the process proceeds to step S106. In step S106, the initiator retransmits the command ATR_RES in which the capsules [0] to [n] are stored to the target.

Thereafter, the process returns to step S101, and processing of step S101 and subsequent steps is repeated. That is, the response ATR_RES transmitted from the target in reply to the command ATR_RES retransmitted in the processing of step S106 is obtained in the processing of step S101. Then, subsequent processing for the response ATR_RES is repeated.

When the target cannot perform the "ATR_REQ receiving process on the target side" of FIG. 21, that is, when the target cannot handle the capsule 51 of FIG. 12, a loop processing of steps S101 to S106 is repeated indefinitely. Accordingly, although not shown in the figure, when the initiator counts the number of repetitions of the loop processing of steps S101 to S106 and the number of repetitions becomes greater than or equal to a predetermined threshold value, the target is assumed to be an NFC communication apparatus that cannot handle the capsule 51, and a predetermined process of internally storing the set content of the response ATR_RES is performed. Then, the "ATR_RES receiving process on the initiator side" may be forcedly completed.

On the other hand, in the "ATR_REQ receiving process on the target side" of FIG. 21, when the above-described processing of steps S86 and S87 is performed, the response ATR_RES containing the capsules [0] to [k] is transmitted from the target to the initiator in the processing of step S90, and the response ATR_RES is received in the processing of step S101, and the response ATR_RES is correctly interpreted in the processing of step S102, it is determined in step S103 that information has been stored in the fields Gi[0] to Gi[n] of the response ATR_RES, and the process then proceeds to step S104.

In step S104, the initiator performs a predetermined process in accordance with each of the fields Gi[0] to Gi[n] of the response ATR_RES, that is, a predetermined process in accordance with each content of the capsules [0] to capsule [k] stored in the fields Gi[0] to Gi[n], respectively. A specific example of the predetermined process performed in step S104 will be described later.

In step S105, the initiator determines whether or not the predetermined process in step S104 has succeeded.

When it is determined in step S105 that the predetermined process in step S104 has failed (has not succeeded), the process proceeds to step S106, and processing of step S106 and subsequent steps is repeated. That is, in the processing of step S106, the command ATR_RES in which the capsules [0] to [n] are stored is retransmitted. In step S101, the response ATR_RES therefor is obtained in step S101, and processing of step S101 and subsequent steps for the response ATR_RES is repeated.

On the other hand, when it is determined in step S105 that the predetermined process in step S104 has succeeded, the "ATR_RES receiving process on the initiator side" is completed.

In the foregoing, the "ATR_REQ transmission process on the initiator side" of FIG. 20, the "ATR_REQ receiving process on the target side" of FIG. 21, and the "ATR_RES receiving process on the initiator side" of FIG. 22 have been described.

Figure 11:
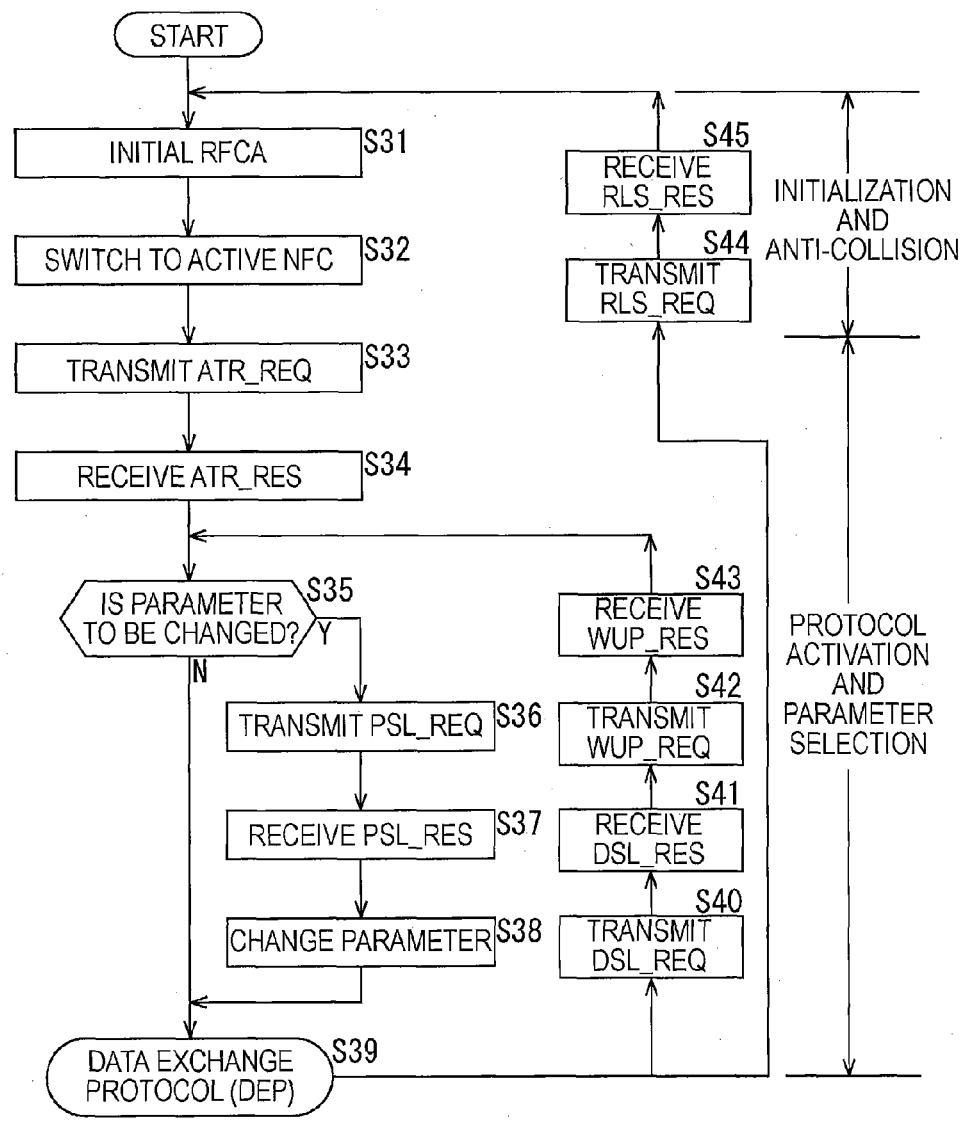
FIG. 11 is a flowchart illustrating an activation protocol in an active mode.

When the "ATR_REQ transmission process on the initiator side" of FIG. 20 is performed as the processing of step S16 of FIG. 10 or as the processing of step S33 of FIG. 11 and the "ATR_RES receiving process on the initiator side" of FIG. 22 is performed as the processing of step S17 of FIG. 10 or as the processing of step S34 of FIG. 11, the command ATR_REQ and the response ATR_RES are exchanged once each.

However, the number of exchanges of the command ATR_REQ and the response ATR_RES is not limited to once and may be a plurality of times.

The following has been described above: for example, by transmitting and receiving the command ATR_REQ and the response ATR_RES containing the capsule 51 of FIG. 12 described above between the initiator and the target, information regarding the presence of a predetermined type of capability is exchanged so that instruction and confirmation of the activation of the capability is possible. As a method for implementing the above, the initiator and the target perform the exchange of the command ATR_REQ and the response ATR_RES once in order to exchange information regarding the presence of a predetermined type of capability and thereafter can perform the exchange of the command ATR_REQ and the response ATR_RES one more time in order to instruct and confirm the activation of the predetermined type of capability.

In this case, although not shown in the figure, the processing of steps S16 and S17 of FIG. 10 or the processing of steps S33 and S34 of FIG. 11 is repeated two times, and thereafter, the processing of step 18 of FIG. 10 or the processing of step S35 of FIG. 11 is performed. That is, a series of processes of the "ATR_REQ transmission process on the initiator side" of FIG. 20, the "ATR_REQ receiving process on the target side" of FIG. 21, and the "ATR_RES receiving process on the initiator side" of FIG. 22 are repeated two times, and thereafter the processing of step 18 of FIG. 10 or the processing of step S35 of FIG. 11 is performed.

A description will be given below of a specific example of a series of processes of the "ATR_REQ transmission process on the initiator side" of FIG. 20, the "ATR_REQ receiving process on the target side" of FIG. 21, and the "ATR_RES receiving process on the initiator side" of FIG. 22, which are performed to exchange information regarding the presence of a predetermined type of capability. Then, following the description, a description will be given of a specific example of a series of processes of the "ATR_REQ transmission process on the initiator side" of FIG. 20, the "ATR_REQ receiving process on the target side" of FIG. 21, and the "ATR_RES receiving process on the initiator side" of FIG. 22, which are performed so that instruction and confirmation of the activation of the predetermined type of capability is possible.

That is, a description will be given below by using the capability of the control of output electric power of wireless communication between the initiator and the target (hereinafter referred to as "RF power control) as a specific example of one type of capability. In other words, a description will be given below of a specific example of a series of processes performed by the initiator and the target when the initiator and the target exchange the level of the RF power control capability, and issue instructions for performing RF power control (instruct activation) and make a confirmation within the range of the level.

In this case, initially, in order to exchange information regarding the RF power control capability, the initiator and the target perform once a series of processes of the "ATR_REQ transmission process on the initiator side" of FIG. 20, the "ATR_REQ receiving process on the target side" of FIG. 21, and the "ATR_RES receiving process on the initiator side" of FIG. 22.

In more detail, the initiator generates, for example, the following capsule [0] in the processing of step S61 of FIG. 20.

That is, the initiator sets information indicating the content of a "report of the RF power control capability" in the "information instructing processing" field 62 of FIG. 12.

Next, the initiator sets the following information as information indicating the capability of the RF power control of the initiator in the "information indicating capabilities" field 63: "whether or not the output power can exceed a predetermined maximum value Hmax", "whether or not the output power can fall below a predetermined minimum value Hmin", "at what levels between the maximum value Hmax and the minimum value Hmin can the output power be adjusted", "indication of a default value", "at what levels between the maximum value Hmax and the maximum output electric power (RF power) specific to the apparatus can the output power be adjusted", "at what levels between the minimum value Hmin and the minimum output electric power (RF power) specific to the apparatus can the output power be adjusted", and others.

Next, the initiator sets a command of "storing the set value of the "information indicating capabilities" field 63" in the "instructions for information indicating capabilities" field 64.

Next, the initiator sets, in the "supplementary information" field 65, "information indicating the content that if each piece of information stored in the capsule 51 is understood and the storage of the set value of the "information indicating capabilities" field 63 is completed, make a reply by setting a predetermined password that "interpretation of RF power capability is completed" in the "supplementary information" field 65 within the capsule 51 contained in the response ATR_RES.

Then, the initiator arranges each field that is set in this manner in the sequence shown in FIG. 12, thereby generating a capsule [0].

Next, in the processing of step S62 of FIG. 20, the initiator stores the capsule [0] in the field Gi[0] of the command ATR_REQ.

Next, in the processing of step S63, the initiator performs the setting of the field PPi of the command ATR_REQ. More specifically, the initiator sets 1 in bit 1 of FIG. 16 described above, that is, sets 1 as information Gi, so as to indicate that the field Gi (general byte) is valid. In this case, since only the field Gi[0] is used and as a result, the command ATR_REQ extending up to the field Byte 14 is formed, the initiator sets "00" in bits 4 and 5 of FIG. 16. That is, "00" is set as information LRi. In this case, since n=0, "00" is set as information LRi. As described above, an appropriate value corresponding to an actual n among "00", "01", "11", and "11" is set. Furthermore, the initiator also sets an appropriate value in the other bits of the field PPi.

Then, in the processing of step S64, the initiator performs the setting of the other fields (the field BSi, the field BRi, and the like in FIG. 13). In the processing of step S65, the initiator transmits the command ATR_REQ in which each piece of information (each value) has been set in this manner to the target.

Then, in the processing of step S81 of FIG. 21, the target receives the command ATR_REQ and interprets it in the processing of step S82.

When the interpretation of the command ATR_REQ in step S82 has succeeded, it is determined in the processing of step S83 that information has been stored in the field Gi[0] of the command ATR_REQ, and the process then proceeds to step S84.

In the processing of step S84, the target performs, for example, the following process in accordance with the capsule [0] stored in the field Gi[0] of the command ATR_REQ.

That is, in this case, in the "information instructing processing" field 62 of FIG. 12 within the capsule [0], information indicating content of a "report of the RF power control capability" is set. Therefore, the target recognizes that the capsule [0] is a capsule for making a "report of the RF power control capability" for the initiator.

Next, the target receives the set content of the "instructions for information indicating capabilities" field 64 within the capsule [0], that is, a command of "storing the set value of the "information indicating capabilities" field 63", reads the set content of the "information indicating capabilities" field 63 within the capsule [0], and stores it inside itself.

Next, the target recognizes the set content of the "supplementary information" field 65 within the capsule [0], that is, content that "if each piece of information stored in the capsule 51 is understood and the storage of the set value of the "information indicating capabilities" field 63 is completed, make a reply by setting a predetermined password that "interpretation of RF power capability is completed" in the "supplementary information" field 65 within the capsule 51 contained in the response ATR_RES.

As a result, it is determined in the processing of step S85 that the predetermined process has succeeded, and the process then proceeds to step S86.

In the processing of step S86, the target generates, for example, the following capsule [0] for the response ATR_RES.

That is, the target sets information indicating content of a "report of the capabilities of its own for RF power control and a reply to the report from the initiator" in the "information instructing processing" field 62 of FIG. 12.

Next, the target sets the following information as information indicating capabilities of the RF power control of its own in the "information indicating capabilities" field 63: "whether or not the output power can exceed a predetermined maximum value Hmax", "whether or not the output power can fall below a predetermined minimum value Hmin", "at what levels between the maximum value Hmax and the minimum value Hmin can the output power be adjusted", "indication of a default value", "at what levels between the maximum value Hmax and the maximum output electric power (RF power) specific to the apparatus can the output power be adjusted", "at what levels between the minimum value Hmin and the minimum output electric power (RF power) specific to the apparatus can the output power be adjusted", and others.

Next, the target sets a command of "storing the set value of the "information indicating capabilities" field 63" in the "instructions for information indicating capabilities" field 64.

Next, the target sets information indicating a predetermined password that the "interpretation of RF power capability is completed" in the "supplementary information" field 65 in accordance with the above-described instructions contained in the command ATR_REQ from the initiator.

Then, the target arranges each field set in this manner in the sequence shown in FIG. 12, thereby generating a capsule [0].

Next, in the processing of step S87 of FIG. 21, the target stores the capsule [0] in the field Gi[0] of the response ATR_RES.

Next, in the processing of step S88, the target performs the setting of the field PPi of the command ATR_REQ. In more detail, the target sets 1 in bit 1 of FIG. 16 described above, that is, sets 1 as information Gi, thereby indicating that the field Gi (general byte) is valid. In this case, since only the field Gi[0] is used and as a result, the response ATR_RES extending up to the field Byte 14 is formed, the target sets "00" in bits 4 and 5 of FIG. 16. That is, "00" is set as information LRi. In this case, since n=0, "00" is set as information LRi. As described above, an appropriate value corresponding to an actual n among "00", "01", "11", and "11" is set. Furthermore, the target sets an appropriate value in the other bits of the field PPi.

Then, in the processing of step S89, the target performs the setting of the other fields (the field BSi, the field BRi, and the like in FIG. 13). In the processing of step S90, the target transmits the response ATR_RES in which each piece of information (each value) has been stored in this manner to the initiator.

Then, in the processing of step S101 of FIG. 22, the initiator receives the response ATR_RES and interprets it in the processing of step S102.

When the interpretation of the response ATR_RES in step S102 has succeeded, it is determined in the processing of step S103 that information has been stored in the field Gi[0] of the response ATR_RES, and the process then proceeds to step S104.

In the processing of step S104, the initiator performs, for example, the following process in accordance with the capsule [0] stored in the field Gi[0] of the response ATR_RES.

That is, in this case, since information indicating the content of a "report of the RF power control capability and a reply to the report from the initiator" is set in the "information instructing processing" field 62 of FIG. 12 within the capsule [0], the initiator recognizes that the capsule [0] is a capsule for making a report of the RF power control capability for the target and for making a reply to the previously transmitted command ATR_REQ.

Next, the initiator receives the set content of the "instructions for information indicating capabilities" field 64 within the capsule [0], that is, a command of "storing the set value of the "information indicating capabilities" field 63", reads the set content of the "information indicating capabilities" field 63 within the capsule [0], and stores it inside itself.

Then, the initiator recognizes the set content of the "supplementary information" field 65 within the capsule [0], that is, the content of the predetermined password that the "interpretation of the RF power capability is completed".

As a result, it is determined in the processing of step S105 that the predetermined process has succeeded, and the "ATR_RES receiving process on the initiator side" is completed.

In the manner described above, it is possible for the initiator and the target to exchange the level of the RF power control capability.

Next, in order to make an instruction (instruct activation) of performing RF power control within the range of the level and make a confirmation thereof, the initiator and the target perform once a series of processes of the "ATR_REQ transmission process on the initiator side" of FIG. 20, the "ATR_REQ receiving process on the target side" of FIG. 21, and the "ATR_RES receiving process on the initiator side" of FIG. 22.

In more detail, in the processing of step S61 of FIG. 20, the initiator generates, for example, the following capsule [0].

That is, the initiator sets information indicating the content of "instructing execution" in the "information instructing processing" field 62 of FIG. 12.

Next, the initiator sets information indicating the content of an "object to be instructed so as to be executed is RF power control" in the "information indicating capabilities" field 63.

Next, the initiator sets a command of "lowering the output electric power (RF power) by two levels lower than the minimum value Hmin in the "instructions for information indicating capabilities" field 64. Here, it is assumed that the initiator has recognized information such that, as a result of the above-described series of processes for the exchange of the information regarding the presence of capability, the target has a capability of performing adjustments at three levels in the range of the minimum value Hmin to zero.

Next, the initiator sets, in the "supplementary information" field 65, "information indicating content that if each piece of information stored in the capsule 51 is understood and the execution of processing for the command set in the "instructions for information indicating capabilities" field 64 is completed, make a reply by setting a predetermined password that "the output voltage has been successfully lowered by two levels" in the "supplementary information" field 65 within the capsule 51 contained in the response ATR_RES.

Then, the initiator generates a capsule [0] by arranging each field set in this manner in the sequence shown in FIG. 12.

Next, in the processing of step S62 of FIG. 20, the initiator stores the capsule [0] in the field Gi[0] of the command ATR_REQ.

Next, in the processing of step S63, the initiator performs the setting of the field PPi of the command ATR_REQ. In more detail, the initiator sets 1 in bit 1 of FIG. 16 described above, that is, sets 1 as information Gi, so as to indicate that the field Gi (general byte) is valid. Furthermore, in this case, since only the field Gi[0] is used and as a result, the command ATR_REQ extending up to the field Byte 14 is formed, the initiator sets "00" in bits 4 and 5 of FIG. 16. That is, "00" is set as information LRi. In this case, since n=0, "00" is set as information LRi. However, as described above, an appropriate value corresponding to an actual n among "00", "01", "11", and "11" is set. Furthermore, the initiator sets an appropriate value in the other bits of the field PPi.

Then, in the processing of step S64, the initiator performs the setting of the other fields (the field BSi, the field BRi, and the like of FIG. 13). In the processing of step S65, the initiator transmits the command ATR_REQ in which each information (each value) has been stored in this manner to the target.

Then, in the processing of step S81 of FIG. 21, the target receives the command ATR_REQ and interprets it in the processing of step S82.

When the interpretation of the command ATR_REQ in step S82 has succeeded, it is determined in the processing of step S83 that information has been stored in the field Gi[0] of the command ATR_REQ, and the process then proceeds to step S84.

In the processing of step S84, the target performs, for example, the following process in accordance with the capsule [0] stored in the field Gi[0] of the command ATR_REQ.

That is, in this case, since information indicating the content of "instruct execution" is set in the "information instructing processing" field 62 of FIG. 21 within the capsule [0], the target recognizes that the capsule [0] is a capsule for instructing the activation of a predetermined type of capability.

Therefore, in order to recognize which type of capability should be instructed to be activated, the target reads the set content of the "information indicating capabilities" field 63 within the capsule [0]. In this case, information indicating the content of an "object to be instructed so as to be executed is RF power control" is read out. Therefore, the target recognizes that the capsule [0] is a capsule for instructing the execution of RF power control.

Next, the target receives the set content of the "instructions for information indicating capabilities" field 64, that is, a command of "lowering the output electric power (RF power) by two levels lower than the minimum value Hmin", and performs various kinds of processing necessary to lower the output electric power (RF power) of its own by two levels lower than the minimum value Hmin.

Then, the target recognizes the set content of the "supplementary information" field 65 within the capsule [0], that is, the content that "if each piece of information stored in the capsule 51 is understood and the execution of processing for the command set in the "instructions for information indicating capabilities" field 64 is completed, make a reply by setting a predetermined password that "the output voltage has been successfully lowered by two levels" in the "supplementary information" field 65 within the capsule 51 contained in the response ATR_RES.

As a result, it is determined in the processing of step S85 that the predetermined process has succeeded, and the process then proceeds to step S86.

In the processing of step S86, the target generates, for example, the following capsule [0] for the response ATR_RES.

That is, the target sets information indicating the content of a "reply to the command from the initiator" in the "information instructing processing" field 62 of FIG. 12.

Next, in accordance with the above-described instructions contained in the command ATR_REQ from the initiator, the target sets information indicating a predetermined password that "the output voltage has been successfully lowered by two levels" in the "supplementary information" field 65.

Then, the target generates a capsule [0] by arranging each field set in this manner in the sequence shown in FIG. 12.

At this point, by assuming that only a reply to the command from the initiator is to be made, the target sets nothing in the "information indicating capabilities" field 63 and the "instructions for information indicating capabilities" field 64. However, when the target is to perform RF power control on the initiator side, it is also possible to set the same content as the set content of the capsule G[0] contained in the command ATR_REQ from the initiator in the "information indicating capabilities" field 63 and the "instructions for information indicating capabilities" field 64.

Next, in the processing of step S87 of FIG. 21, the target stores the capsule [0] in the field Gi[0] of the response ATR_RES.

Next, in the processing of step S88, the target performs the setting of the field PPi of the command ATR_REQ. In more detail, the target sets 1 in bit 1 of FIG. 16 described above, that is, sets 1 as information Gi, thereby indicating that the field Gi (general byte) is valid. In this case, since only the field Gi[0] is used and as a result, the response ATR_RES extending up to field Byte 14 is formed, the target sets "00" in bits 4 and 5 of FIG. 16. That is, "00" is set as information LRi. In this case, since n=0, "00" is set as information LRi. However, as described above, an appropriate value corresponding to an actual n among "00", "01", "11", and "11" is set. Furthermore, the target sets an appropriate value in the other bits of the field PPi.

Then, in the processing of step S89, the target performs the setting of the other fields (the field BSi, the field BRi, and the like of FIG. 13). In the processing of step S90, the target transmits the response ATR_RES in which each information (each value) has been set in this manner to the initiator.

Then, in the processing of step S101 of FIG. 22, the initiator receives the response ATR_RES, and interprets it in the processing of step S102.

When the interpretation of the response ATR_RES in step S102 succeeds, it is determined in the processing of step S103 that information has been stored in the field Gi[0] of the response ATR_RES, and the process then proceeds to step S104.

In the processing of step S104, the initiator performs, for example, the following process in accordance with the capsule [0] stored in the field Gi[0] of the response ATR_RES.

That is, in this case, since information indicating the content of a "reply to the command from the initiator" is set in the "information instructing processing" field 62 of FIG. 12 within the capsule [0], the initiator recognizes that the capsule [0] is a capsule for making a reply to the previously transmitted command ATR_REQ.

Therefore, the initiator recognizes the set content of the "supplementary information" field 65 within the capsule [0], that is, the content of a predetermined password that "the output voltage has been successfully lowered by two levels".

As a result, it is determined in the processing of step S105 that the predetermined process has succeeded, and the "ATR_RES receiving process on the initiator side" is completed.

In the manner described above, after the initiator and the target exchange the level of the RF power control capability with each other, the initiator and the target can issue instructions (instruct activation) for performing RF power control within the range of the level and confirm it.

As a result, for example, when the initiator writes information with high importance to the target or reads it from the target, it is possible to suppress an output voltage when the information is transmitted and received so as to be as low possible. As a result, it is possible to maintain the confidentiality of the information, that is, the advantage of preventing eavesdropping of the information can be obtained. In particular, when the target is constituted by a card or the like and the initiator writes important information, such as key information, into the card when the card is issued, this advantage becomes more conspicuous.

Furthermore, for example, when the initiator performs communication with a predetermined target as a communication party in a state in which another target exists, collisions may occur in the manner described above. Also, in such a case, the initiator can obtain an advantage capable of preventing collisions by suppressing the output electric power of another target and by increasing the output voltage of the target of the communication party.

In the above-described example, in both the cases in which the level of the RF power control capability is to be exchanged and in which instructions (instruct activation) and confirmation for performing RF power control within the range of the level are to be made, the capsule 51 of FIG. 12 is stored in the command ATR_REQ and the response ATR_RES. However, as described above, the storage location is not particularly limited. For example, when the level of the RF power control capability is to be exchanged, the capsule 51 can also be stored in the command ATR_REQ and the response ATR_RES, and when instructions (instruct activation) and confirmation for performing RF power control within the range of the level are to be made, the capsule 51 can also be stored in the command DEP_REQ and the response DEP_RES.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

In this specification, steps which describe a program recorded on a recording medium do not always need to be time-sequentially performed in the order thereof, but include steps executed in parallel or individually.

The invention claimed is:

1. A communication apparatus having a plurality of capabilities, at least a first one of the capabilities complying with a communication protocol and at least a second one of the capabilities being different from any capability that complies with the communication protocol, the communication apparatus comprising:
 a processor; and
 a memory device which stores:
 (A) a first plurality of instructions, which when executed by the processor, cause the processor to:
  (a) cause communication to be performed with at least a first communication apparatus of a communication party, the first communication apparatus having the at least one capability which complies with the communication protocol, the communication being performed in accordance with the communication protocol, the communication protocol additionally defining one or more commands and one or more responses, and the communication being performed in one of: (i) an active mode, which is a communication mode in which each of a plurality of apparatuses for transmitting and receiving data outputs an electromagnetic wave, modulates the electromagnetic wave, and thereby transmits data, and (ii) a passive mode, which is a communication mode in which one apparatus among a plurality of apparatuses outputs an electromagnetic wave, modulates the electromagnetic wave, and thereby transmits data, and the other apparatuses among the plurality of apparatuses transmit data by load-modulating the electromagnetic wave output by the one apparatus; and
  (b) control the communication with the first communication apparatus of the communication party such that a data group containing one or more pieces of information related to capabilities possessed by the communication apparatus or the first communication apparatus is generated for each type of capability and subsequently transmitted, wherein the one or more generated data groups is stored in a predetermined one of the one or more commands and the one or more responses defined by the communication protocol, and wherein the communication protocol further defines: (i) attributes that should be or can be possessed by the communication apparatus and the first communication apparatus of the communication party; (ii) an attribute command for notifying or requesting the first communication apparatus of the communication party of the attributes as one of the one or more commands; and (iii) an attribute response to the attribute command as one of the one or more commands; and
 (B) a second, different plurality of instructions, which when executed by the processor, cause the processor to:
  (a) cause communication to be performed according to (A)(a)(i) and (A)(a)(ii) with at least a second communication apparatus of the communication party, the second communication apparatus having the at least one capability which is different from any capability which complies with the communication protocol; and
  (b) control the communication with the second communication apparatus of the communication party such that the communication with the second communication apparatus of the communication party is performed in accordance with the at least one capability which is different from any capability which complies with the communication protocol, wherein a data group containing one or more pieces of information related to capabilities possessed by the communication apparatus or the second communication apparatus is generated for each type of capability and subsequently transmitted, and wherein the one or more generated data groups are stored in a predetermined one of the one or more commands and the one or more responses defined by the communication protocol, wherein the first plurality of instructions and the second plurality of instructions cause the communication apparatus to communicate by employing a capsule complying with the communication protocol, the capsule including:
- (a) an information instructing processing field instructing a predetermined process be executed by the communication party,
- (b) an information indicating capabilities field indicating a type of capability possessed by the communication apparatus that differs form a capability complying with the communication protocol, and
- (c) an instructions for information indicating capabilities field including instructions used by the communication party to perform the type of capability that differs from the capability complying with the communication protocol set in the information indicating capabilities field.

2. The communication apparatus according to claim 1, wherein at least one of the first and second plurality of instructions, when executed by the processor, cause the processor to control communication such that the data group containing one or more pieces of information related to the capabilities is generated for each of n+1 types (n is an integer of 0 or more) of capabilities differing from the capabilities which comply with the communication protocol, stored in an attribute command, and subsequently transmitted.

3. The communication apparatus according to claim 2, wherein at least one of the first and second plurality of instructions, when executed by the processor, cause the processor to control communication such that a data group containing at least information indicating a level that is or can be possessed by the communication apparatus is generated for each of the n+1 types of capabilities, stored in the attribute command, and subsequently transmitted.

4. The communication apparatus according to claim 2, wherein at least one of the first and second plurality of instructions, when executed by the processor, cause the processor to control communication such that the communication apparatus generates a data group containing at least an instruction for notifying the communication apparatus of a level of a corresponding type of capability that is possessed or can be possessed by the first or second communication apparatus of the communication party for each of the n+1 types of capabilities, the at least one instruction being stored in an attribute command.

5. The communication apparatus according to claim 2, wherein, in response to receiving an attribute command from the first or second communication apparatus in the communication party which includes at least an instruction for notifying the communication apparatus of a level that is possessed or can be possessed by the communication apparatus of the communication party, the second plurality of instructions, when executed by the processor, cause the processor to control communication such that, on the basis of the at least one instruction contained in each n+1 data group stored in the received attribute command, a data group containing at least information indicating the level of a corresponding type of capability that is or can be possessed by the communication apparatus, is generated, stored in the attribute response, and subsequently transmitted.

6. The communication apparatus according to claim 2, wherein the second plurality of instructions, when executed by the processor, cause the processor to control communication such that a data group containing at least an instruction instructing at least one of a plurality of communication apparatuses in the communication party to activate a corresponding type of capability is generated for each of the n+1 types of capabilities, stored in the attribute command, and transmitted.

7. The communication apparatus according to claim 2, wherein, in response to receiving an attribute command from the first or second communication apparatus in the communication party which includes at least an instruction instructing that the communication apparatus activate a capability
- the second plurality of instructions, when executed by the processor, cause the processor to control communication by activating each n+1 type of capability on the basis of the instruction contained in the received attribute command, and
- further control communication such that a data group containing at least information indicating the result of the activation of the corresponding type of capability is generated for each of the n+1 types of capabilities, stored in an attribute response, and transmitted.

8. The communication apparatus according to claim 1, wherein one type among one or more types of capabilities identified by information contained in each of the one or more data groups stored in the command or the response is a capability for controlling the power of an electromagnetic wave output by the communication apparatus or a communication apparatus of the communication party.

9. A method of operating a communication apparatus having a plurality of capabilities, at least a first one of the capabilities complying with a communication protocol and at least a second one of the capabilities being different from any capability which complies with the communication protocol, the communication method comprising:
causing a processor of the communication apparatus to execute a first plurality of instructions to:
- (a) cause communication to be performed between the communication apparatus and at least a first communication apparatus of a communication party, the first communication apparatus having the at least one capability which complies with the communication protocol, the communication being performed in accordance with the communication protocol, the communication protocol additionally defining one or more commands and one or more responses;
- (b) cause communication to be performed in one of: (i) an active mode, which is a communication mode in which each of a plurality of apparatuses for transmitting and receiving data outputs an electromagnetic wave, modulates the electromagnetic wave, and thereby transmits data, and (ii) a passive mode, which is a communication mode in which one apparatus among a plurality of apparatuses outputs an electromagnetic wave, modulates the electromagnetic wave, and thereby transmits data, and the other apparatuses among the plurality of apparatuses transmit data by load-modulating the electromagnetic wave output by the one apparatus; and
- (c) control the communication with the first communication apparatus of the communication party such that a data group containing one or more pieces of information related to capabilities possessed by the communication apparatus or the first communication apparatus is generated for each type of the capabilities and subsequently transmitted, wherein the one or more generated data groups are stored in a predetermined one of the one or more commands and the one or more responses defined by the communication protocol, and wherein the communication protocol further defines: (i) attributes that should be or can be possessed by the communication apparatus and the first communication apparatus of the communication party; (ii) an attribute command for notifying or requesting the first communication apparatus of the communication party of the attributes as one of the one or more commands; and (iii) an attribute response to the attribute command as one of the one or more commands; and causing the processor of the communication apparatus to execute a second, different plurality of instructions to:
 (a) cause communication to be performed according to (b)(i) and (b)(ii) with at least a second communication apparatus of the communication party, the second communication apparatus having the at least one capability which is different from any capability which complies with the communication protocol; and
 (b) control the communication with the second communication apparatus of the communication party such that the communication with the second communication apparatus of the communication party is performed in accordance with the at least one capability which is different from any capability which complies with the communication protocol, wherein a data group containing one or more pieces of information related to capabilities possessed by the communication apparatus or the second communication apparatus is generated for each type of capability and subsequently transmitted, and wherein the one or more generated data groups are stored in a predetermined one of the one or more commands and the one or more responses defined by the communication protocol, wherein the first plurality of instructions and the second plurality of instructions cause the communication apparatus to communicate by employing a capsule complying with the communication protocol, the capsule including:
 (a) an information instructing processing field instructing a predetermined process be executed by the communication party,
 (b) an information indicating capabilities field indicating a type of capability possessed by the communication apparatus that differs form a capability complying with the communication protocol, and
 (c) an instructions for information indicating capabilities field including instructions used by the communication party to perform the type of capability that differs from the capability complying with the communication protocol set in the information indicating capabilities field.

10. A non-transitory computer readable medium storing a computer program comprising:
 a first plurality of instructions, which when executed by a processor of a communication apparatus having a plurality of capabilities, at least a first one of the capabilities complying with a communication protocol and at least a second one of the capabilities being different from any capability which complies with the communication protocol, cause the processor to:
 (a) cause communication to be performed with at least a first communication apparatus of a communication party, the first communication apparatus having the at least one capability which complies with the communication protocol, the communication being performed in accordance with the communication protocol, the communication protocol additionally defining one or more commands and one or more responses,
 (b) cause communication to be performed in one of: (i) an active mode, which is a communication mode in which each of a plurality of apparatuses for transmitting and receiving data outputs an electromagnetic wave, modulates the electromagnetic wave, and thereby transmits data, and (ii) a passive mode, which is a communication mode in which one apparatus among a plurality of apparatuses outputs an electromagnetic wave, modulates the electromagnetic wave, and thereby transmits data, and the other apparatuses among the plurality of apparatuses transmit data by load-modulating the electromagnetic wave output by the one apparatus
 (c) control the communication with the first communication apparatus of the communication party such that a data group containing one or more pieces of information related to capabilities possessed by the communication apparatus or the first communication apparatus is generated for each type of capability and subsequently transmitted, wherein the one or more generated data groups is stored in a predetermined one of the one or more commands and the one or more responses defined by the communication protocol, and wherein the communication protocol further defines: (i) attributes that should be or can be possessed by the communication apparatus and the first communication apparatus of the communication party; (ii) an attribute command for notifying or requesting the first communication apparatus of the communication party of the attributes as one of the one or more commands; and (iii) an attribute response to the attribute command as one of the one or more commands; and a second, different plurality of instructions, which when executed by the processor of the communication apparatus, cause the processor to:
 (a) cause communication to be performed according to (b)(i) and (b)(ii) with at least a second communication apparatus of the communication party, the second communication apparatus having the at least one capability which is different from any capability which complies with the communication protocol; and
 (b) control the communication with the second communication apparatus of the communication party such that the communication with the second communication apparatus of the communication party is performed in accordance with the at least one capability which is different from any capability which complies with the communication protocol, wherein a data group containing one or more pieces of information related to capabilities possessed by the communication apparatus or the second communication apparatus is generated for each type of capability and subsequently transmitted, and wherein the one or more generated data groups are stored in a predetermined one of the one or more commands and the one or more responses defined by the communication protocol, wherein the first plurality of instructions and the second plurality of instructions cause the communication apparatus to communicate by employing a capsule complying with the communication protocol, the capsule including:
  (a) an information instructing processing field instructing a predetermined process be executed by the communication party,
  (b) an information indicating capabilities field indicating a type of capability possessed by the communication apparatus that differs form a capability complying with the communication protocol, and
  (c) an instructions for information indicating capabilities field including instructions used by the communication party to perform the type of capability that differs from the capability complying with the communication protocol set in the information indicating capabilities field.

11. A communication apparatus for sending and receiving data by electromagnetic waves, wherein the communication apparatus has a plurality of capabilities, at least a first one of the capabilities complying with a communication protocol and at least a second one of the capabilities being different from any capability which complies with the communication protocol, the communication apparatus comprising:
  a processor; and
  a memory device which stores:
  (A) a first plurality of instructions, which when execute by the processor, cause the processor to:
    (a) cause electromagnetic wave generating means for forming a radio frequency field to generate electromagnetic waves;
    (b) cause modulating means for sending data to modulate electromagnetic waves in compliance with the communication protocol, wherein the communication protocol additionally defines one or more commands and one or more responses;
    (c) cause demodulating means for demodulating electromagnetic waves to acquire data sent from at least a first communication apparatus; and
    (d) cause control means for performing control to control communication with the first communication apparatus such that a data group containing one or more pieces of information related to capabilities possessed by the communication apparatus or the first communication apparatus is generated for each type of capability and subsequently transmitted, wherein the one or more generated data groups is stored in a predetermined one of the one or more commands and the one or more responses defined by the communication protocol, and wherein the communication protocol further defines: (i) attributes that should be or can be possessed by the communication apparatus and the first communication apparatus; (ii) an attribute command for notifying or requesting the first communication apparatus of the attributes as one of the one or more commands; and (iii) an attribute response to the attribute command as one of the one or more commands; and
  (B) a second plurality of instructions, which when execute by the processor, cause the processor to:
    (a) cause electromagnetic wave generating means for forming a radio frequency field to generate electromagnetic waves;
    (b) cause modulating means for sending data to modulate electromagnetic waves in compliance with the at least one capability which is different from any capability which complies with the communication protocol; and
    (c) cause demodulating means for demodulating electromagnetic waves to acquire data sent from the at least one second communication apparatus, the second communication apparatus having the at least one capability which is different from any capability which complies with the communication protocol, and the data sent from the at least one second communication apparatus being sent in accordance with the at least one capability which is different from any capability which complies with the communication protocol, wherein a data group containing one or more pieces of information related to capabilities possessed by the communication apparatus or the second communication apparatus is generated for each type of capability and subsequently transmitted, and wherein the one or more generated data groups are stored in a predetermined one of the one or more commands and the one or more responses defined by the communication protocol, wherein the first plurality of instructions and the second plurality of instructions cause the communication apparatus to communicate by employing a capsule complying with the communication protocol, the capsule including:
  (a) an information instructing processing field instructing a predetermined process be executed by the communication party,
  (b) an information indicating capabilities field indicating a type of capability possessed by the communication apparatus that differs form a capability complying with the communication protocol, and
  (c) an instructions for information indicating capabilities field including instructions used by the communication party to perform the type of capability that differs from the capability complying with the communication protocol set in the information indicating capabilities field.

12. A method of operating a communication apparatus having a plurality of capabilities, at least a first one of the capabilities complying with a communication protocol and at least a second one of the capabilities being different from any capability which complies with the communication protocol, the method comprising:
  cause a processor of the communication apparatus to execute a first plurality of instructions to:
    (a) cause a radio frequency field to be formed by causing electromagnetic waves to be generated;
    (b) cause data to be sent by causing electromagnetic waves to be modulated in accordance with the communication protocol, wherein the communication protocol additionally defines one or more commands and one or more responses;
    (c) cause electromagnetic waves to be demodulated so that data sent from a first communication apparatus can be acquired; and
    (d) cause communication with the first communication apparatus to be controlled such that a data group containing one or more pieces of information related to capabilities possessed by the communication apparatus or the first communication apparatus is generated for each type of capability and subsequently transmitted, wherein the one or more generated data groups is stored in a predetermined one of the one or more commands and the one or more responses defined by the communication protocol, and wherein the communication protocol further defines: (i) attributes that should be or can be possessed by the communication apparatus and the first communication apparatus; (ii) an attribute command for notifying or requesting the first communication apparatus of the attributes as one of the one or more commands; and (iii) an attribute response to the attribute command as one of the one or more commands; and cause the processor of the communication apparatus to execute a second, different plurality of instructions to:

(a) cause a radio frequency field to be formed by causing electromagnetic waves to be generated;

(b) cause data to be sent by causing electromagnetic waves to be modulated in accordance with the at least one capability which is different from any capability which complies with the communication protocol;

(c) cause electromagnetic waves to be demodulated so that data sent from at least one second communication apparatus can be acquired, the at least one second communication apparatus having the at least one capability which is different from any capability which complies with the communication protocol, and the data sent from the at least one second communication apparatus being sent in accordance with the at least one capability which is different from any capability which complies with the communication protocol, wherein a data group containing one or more pieces of information related to capabilities possessed by the communication apparatus or the second communication apparatus is generated for each type of capability and subsequently transmitted, and wherein the one or more generated data groups are stored in a predetermined one of the one or more commands and the one or more responses defined by the communication protocol, wherein the first plurality of instructions and the second plurality of instructions cause the communication apparatus to communicate by employing a capsule complying with the communication protocol, the capsule including:

(a) an information instructing processing field instructing a predetermined process be executed by the communication party, (b) an information indicating capabilities field indicating a type of capability possessed by the communication apparatus that differs form a capability complying with the communication protocol, and (c) an instructions for information indicating capabilities field including instructions used by the communication party to perform the type of capability that differs from the capability complying with the communication protocol set in the information indicating capabilities field.

13. The communication apparatus according to claim 1, wherein the first communication apparatus is different from the second communication apparatus.

14. The communication apparatus according to claim 1, wherein the at least one capability which is different from any capability which complies with the communication protocol is a capability which exceeds any capability which complies with the communication protocol.

15. The method of operating a communication apparatus according to claim 9, wherein the first communication apparatus is different from the second communication apparatus.

16. The method of operating a communication apparatus according to claim 9, wherein the at least one capability which is different from any capability which complies with the communication protocol is a capability which exceeds any capability which complies with the communication protocol.

17. The non-transitory computer readable medium according to claim 10, wherein the first communication apparatus is different from the second communication apparatus.

18. The non-transitory computer readable medium according to claim 10, wherein the at least one capability which is different from any capability which complies with the communication protocol is a capability which exceeds any capability which complies with the communication protocol.

19. The communication apparatus according to claim 11, wherein the first communication apparatus is different from the second communication apparatus.

20. The communication apparatus according to claim 11, wherein the at least one capability which is different from any capability which complies with the communication protocol is a capability which exceeds any capability which complies with the communication protocol.

21. The method of operating a communication apparatus according to claim 12, wherein the first communication apparatus is different from the second communication apparatus.

22. The method of operating a communication apparatus according to claim 12, wherein the at least one capability which is different from any capability which complies with the communication protocol is a capability which exceeds any capability which complies with the communication protocol.

23. The communication apparatus according to claim 1, wherein at least one of the first plurality of instructions and the second plurality of instructions cause the communication apparatus to communicate by employing the capsule with a communication party that does not employ the capsule.

24. The communication apparatus according to claim 1, wherein the information instructing processing field indicates the content of a report of a RF power control capability, the information indicating capabilities field indicates at least one of whether an output power can exceed a predetermined maximum value, and whether the output can fall below a predetermined minimum value, and the instructions for information indicating capabilities field includes at least one of a value of the output power that can exceed the predetermined maximum value, and a value of the output power that can fall below the predetermined minimum value.

* * * * *